United States Patent
Katsu et al.

(10) Patent No.: US 11,987,233 B2
(45) Date of Patent: May 21, 2024

(54) ROUTE GENERATION DEVICE, PARKING ASSIST APPARATUS, ROUTE GENERATION METHOD, AND PARKING ASSIST METHOD

(71) Applicant: Mitsubishi Electric Corporation, Tokyo (JP)

(72) Inventors: Kenta Katsu, Tokyo (JP); Takashi Matsumoto, Tokyo (JP); Takahisa Aoyagi, Tokyo (JP); Masataka Shirozono, Tokyo (JP); Hiroshi Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 98 days.

(21) Appl. No.: 17/781,218

(22) PCT Filed: Jan. 17, 2020

(86) PCT No.: PCT/JP2020/001423
§ 371 (c)(1),
(2) Date: May 31, 2022

(87) PCT Pub. No.: WO2021/144944
PCT Pub. Date: Jul. 22, 2021

(65) Prior Publication Data
US 2022/0410873 A1 Dec. 29, 2022

(51) Int. Cl.
*B60W 30/06* (2006.01)
*B60W 10/20* (2006.01)
(Continued)

(52) U.S. Cl.
CPC ............ *B60W 30/06* (2013.01); *B60W 10/20* (2013.01); *B62D 5/0496* (2013.01);
(Continued)

(58) Field of Classification Search
CPC .. B60W 30/06; B60W 10/20; B60W 2510/20; B60W 2556/45; B62D 5/0496; B62D 15/0285
See application file for complete search history.

(56) References Cited

U.S. PATENT DOCUMENTS 8,302,729 B2 * 11/2012 Aoki .................... B62D 5/046
180/443
9,725,117 B2 * 8/2017 Hiei ..................... B62D 5/046
(Continued)

FOREIGN PATENT DOCUMENTS

JP       2006-168428 A    6/2006
JP          6079596 B2    2/2017

OTHER PUBLICATIONS

International Search Report for PCT/JP2020/001423 dated Mar. 17, 2020 (PCT/ISA/210).
(Continued)

*Primary Examiner* — John A Tweel, Jr.
(74) *Attorney, Agent, or Firm* — Sughrue Mion, PLLC; Richard C. Turner

(57) ABSTRACT

A route generation device includes: a steering loaded state input unit to which a steering loaded state of a vehicle is inputted; a parking slot position input unit to which a position of a parking slot near the vehicle is inputted; a vehicle position input unit to which a position of the vehicle is inputted; a number-of-times-of-static-steering upper limit calculation unit configured to calculate, on the basis of the steering loaded state, a number-of-times-of-static-steering upper limit value up to which static steering of the vehicle can be performed between the position of the vehicle and the position of the parking slot; and a guidance route generation unit configured to generate a guidance route for guiding the vehicle to the parking slot, on the basis of the position of the
(Continued)

vehicle, the position of the parking slot, and the number-of-times-of-static-steering upper limit value.

20 Claims, 30 Drawing Sheets

(51) Int. Cl.
    *B62D 5/04*     (2006.01)
    *B62D 15/02*     (2006.01)

(52) U.S. Cl.
    CPC ..... *B62D 15/0285* (2013.01); *B60W 2510/20* (2013.01); *B60W 2556/45* (2020.02)

(56) References Cited

U.S. PATENT DOCUMENTS

| | | | |
|---|---|---|---|
| 11,325,642 B2 * | 5/2022 | Namikawa | ........... B62D 5/0469 |
| 2016/0375933 A1 | 12/2016 | Hiei et al. | |

OTHER PUBLICATIONS

Office Action dated Mar. 22, 2023 issued in Japanese Application No. 2021-570589.

* cited by examiner

FIG. 9

| STEERING LOADED STATE (TEMPERATURE OF EPS MOTOR) | LOWER THAN 30° C | NOT LOWER THAN 30° C AND LOWER THAN 35° C | NOT LOWER THAN 35° C AND LOWER THAN 40° C | NOT LOWER THAN 40° C AND LOWER THAN 45° C | NOT LOWER THAN 45° C AND LOWER THAN 50° C | ... | NOT LOWER THAN 70° C |
|---|---|---|---|---|---|---|---|
| NUMBER-OF-TIMES-OF-STATIC-STEERING UPPER LIMIT VALUE | 8 TIMES | 7 TIMES | 6 TIMES | 5 TIMES | 4 TIMES | ... | 0 TIMES |

ROUTE GENERATION DEVICE, PARKING ASSIST APPARATUS, ROUTE GENERATION METHOD, AND PARKING ASSIST METHOD

CROSS REFERENCE TO RELATED APPLICATIONS

This application is a National Stage of International Application No. PCT/JP2020/001423 filed Jan. 17, 2020.

TECHNICAL FIELD

The present disclosure relates to a route generation device, a parking assist apparatus, a route generation method, and a parking assist method.

BACKGROUND ART

As a parking assist apparatus, a parking assist apparatus that automatically steers an electric power steering so as to perform parking assist for parking the own vehicle at a target parking position has been known (see, for example, Patent Document 1).

The parking assist apparatus in Patent Document 1 includes: an own-vehicle position acquisition unit which acquires a position of the own vehicle; a target parking position determination unit which determines a target parking position; a route generation unit which generates a route from the position of the own vehicle to the target parking position; a temperature detection unit which detects a temperature of the electric power steering; and a parking assist unit which performs automatic steering on the own vehicle such that the own vehicle follows the route generated by the route generation unit. The route generation unit generates a route in which the amount of static steering that, is steering performed in a state where the own vehicle is stopped, is smaller than in the case where, regarding the temperature of the electric power steering detected by the temperature detection unit, the temperature of the electric power steering is lower than the said temperature. Meanwhile, the route generation unit generates a route in which no static steering is included, if the temperature of the electric power steering detected by the temperature detection unit is higher than a predetermined temperature threshold value.

CITATION LIST

Patent Document

Patent Document 1: Japanese Patent No. 6079506

SUMMARY OF THE INVENTION

Problems to be Solved by the Invention

However, in the parking assist apparatus in Patent Document 1, for one time of turnabout, a route in which no static steering is included is generated if the temperature of the electric power steering is higher than the predetermined temperature threshold value. Alternatively, for one time of turnabout, the amount of static steering is set according to the temperature of the electric power steering. Thus, if parking at the target parking position cannot, be achieved through one time of turnabout, a route is generated for each time of turnabout so as to perform: determination as to whether or not to include static steering; or setting of the amount of static steering. Consequently, processing loads on a microcomputer and the like increase, and the time required for parking might be elongated.

The present disclosure has been made to solve the above problem, and an object of the present disclosure is to provide a route generation device in which a number-of-times upper limit up to which static steering can be performed is calculated in advance according to a load situation of an electric power steering, and a guidance route is generated in consideration of the number-of-times upper limit up to which static steering can be performed, so that processing during parking can be reduced and the time for parking can be shortened.

Solution to the Problems

A route generation device according to the present disclosure includes: a steering loaded state input unit to which a steering loaded state of a vehicle is inputted; a parking slot position input unit to which a position of a parking slot near the vehicle is inputted; a vehicle position input unit to which a position of the vehicle is inputted; a number-of-times-of-static-steering upper limit calculation unit configured to calculate, on the basis of the steering loaded state inputted to the steering loaded state input unit, a number-of-times-of-static-steering upper limit value up to which static steering of the vehicle can be performed between the position of the vehicle and the position of the parking slot; and a guidance route generation unit configured to generate a guidance route for guiding the vehicle to the parking slot, on the basis of the position of the vehicle inputted to the vehicle position input unit, the position of the parking slot inputted to the parking slot position input unit, and the number-of-times-of-static-steering upper limit value calculated by the number-of-times-of-static-steering upper limit calculation unit.

A parking assist apparatus according to the present, disclosure includes: the above route generation device; and a vehicle control device configured to cause the vehicle to be parked in the parking slot on the basis of the guidance route generated by the guidance route generation unit of the route generation device.

EFFECT OF THE INVENTION

In the present disclosure, a guidance route is generated before start of parking control on the basis of a number-of-times-of-static-steering upper limit value in consideration of a steering loaded state during parking control. Consequently, determination as to whether or not static steering can be performed does not have to be performed for each time of turnabout during a parking operation. Therefore, the time for computation can be shortened, and the time required for parking can be shortened.

BRIEF DESCRIPTION OF THE DRAWINGS

FIG. 9 illustrates an example of the relationship between steering loaded state and number-of-times-of-static-steering upper limit value.

FIG. 21 is a block diagram showing another configuration of the parking assist apparatus according to embodiment 1.

DESCRIPTION OF EMBODIMENTS

Figure 1:
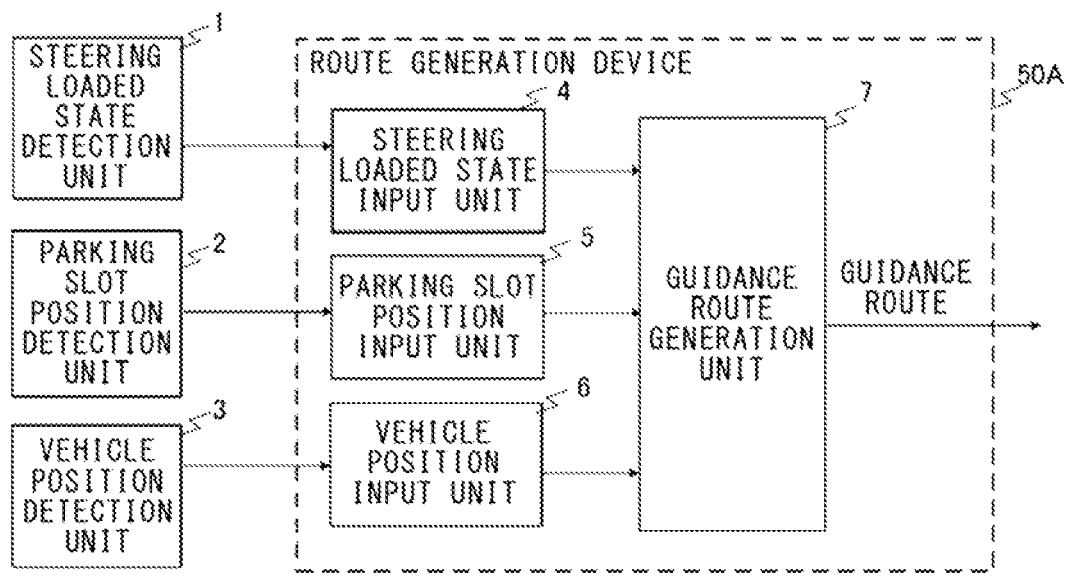
FIG. 1 is a block diagram showing a configuration of a route generation device according to embodiment 1.

Hereinafter, the present embodiments will be described with reference to the drawings. In the drawings, the same or corresponding portions are denoted by the same reference characters.

Embodiment 1

Hereinafter, a route generation device according to embodiment 1 will be described with reference to the drawings.

FIG. 1 is a block diagram showing a configuration of the route generation device according to embodiment 1. A route generation device 50A includes: a steering loaded state input unit 4 to which information about a steering loaded state detected by a steering loaded state detection unit 1 is inputted; a parking slot position input unit 5 to which a position of a parking slot defected by a parking slot position detection unit 2 is inputted; a vehicle position input unit 6 to which a position of an own vehicle detected by a vehicle position detection unit 3 is inputted; and a guidance route generation unit 7 which generates a guidance route to the parking position on the basis of these inputted pieces of information.

The steering loaded state detection unit 1 detects and outputs a steering loaded state of the vehicle. The steering loaded state refers to the temperature of a motor of an electric power steering or the temperature of an electronic control unit (ECU) for the electric power steering. The temperature is acquired through an arbitrarily selected method. For example, a temperature is acquired with a temperature sensor mounted to the motor of the electric power steering or the ECU therefor, and the acquired temperature is outputted as the steering loaded state of the vehicle. In the present embodiment, the motor of the electric power steering and the ECU for the electric power steering are respectively referred to as EPS motor and EPS-intended ECU.

Figure 2:
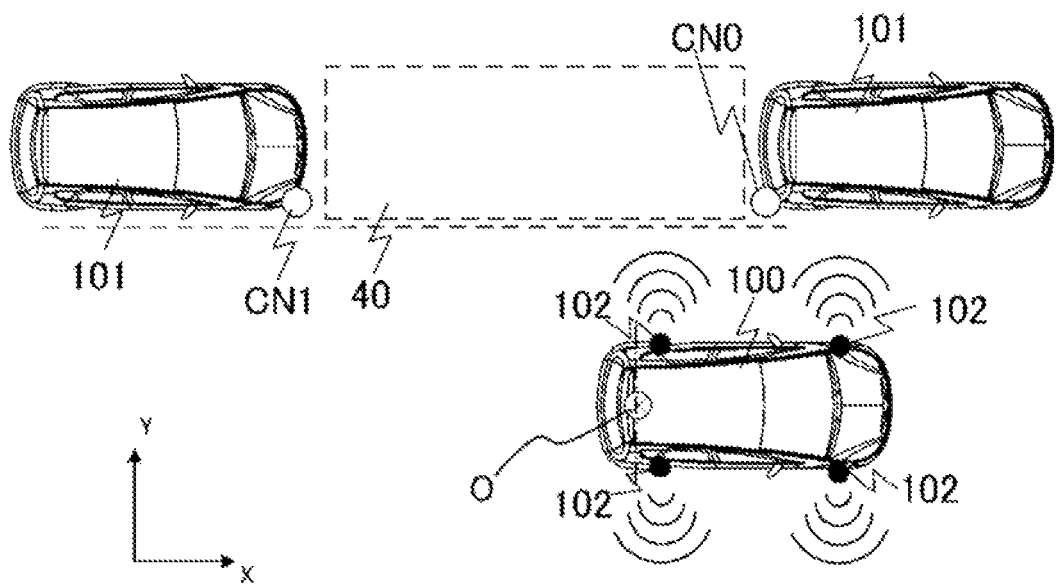
FIG. 2 is a diagram for explaining a method for defecting a position of a parking slot to be inputted to the route generation device according to embodiment 1.

The parking slot position detection unit 2 detects and outputs a position of a parking slot that is a parking space near the vehicle. The parking slot position detection is performed through an arbitrarily selected method. An example of the parking slot position detection will be described with reference to FIG. 2. An own vehicle 100 includes at least one ultrasonic sensor 102. When the own vehicle 100 passes beside the interval between parked vehicles 101, the own vehicle 100 detects the shapes of the parked vehicles 101 from distance information acquired by the ultrasonic sensor 102 and acquires the coordinates of corner points CN0 and CN1 of the parked vehicles 101. An origin O for the corner coordinates is a position on the own vehicle 100 at the time of start of parking. The travel direction of the own vehicle is defined as an x-axis, and the vehicle width direction of the vehicle is defined as a y-axis. If the interval between the two corner points is wider than lengths that are the vehicle length and the vehicle width of the own vehicle 100, the parking slot position detection unit 2 detects the interval between the parked vehicles 101 as a parking slot 40. Then, the parking slot position detection unit 2 calculates, from the coordinates of the corner points CN0 and CN1 of the parked vehicles having been detected, coordinates of the position of the parking slot and outputs the coordinates.

Although an example of parking slot detection in which the ultrasonic sensor is used for detecting the position of the parking slot has been described, parking slot detection may be performed by using, instead of the ultrasonic sensor, at least one camera that is provided to the vehicle and that images an area around the vehicle. In the case of a camera, a parking frame line that is included in a group of parking frame lines imaged by the camera and that is wider than the lengths that are the vehicle length and the vehicle width of the own vehicle, only has to be detected as a parking slot, and coordinates of the position of the parking slot only has to be calculated from the coordinates of the points at the four corners of the detected parking slot and outputted.

The vehicle position detection unit 3 detects and outputs a present position of the vehicle. The vehicle position detection is performed through an arbitrarily selected method. For example, a yaw rate and a wheel speed detected by a yaw rate sensor and a wheel speed sensor of the vehicle are used. The position of the own vehicle is obtained by computing a movement position per time on the basis of a movement distance per time obtained from the wheel speed and a yaw angle per time similarly obtained from the yaw rate, and adding up the movement positions from reference axes. Regarding the reference axes, the position of the own vehicle and the azimuth of the own vehicle (the length direction of the vehicle is defined as an x-axis, and the width direction of the vehicle is defined as a y-axis) at the time of start of parking assist, are defined as reference axes. As shown in the drawing, the origin (O) is set at, for example, the position of the center in the vehicle width direction on the rear wheel axle.

Although a method in which the position of the own vehicle and the orientation angle of the own vehicle are calculated from the wheel speed sensor and the yaw rate sensor has been described, the position of the own vehicle and the orientation angle of the own vehicle may be used by employing another known technique, and, regarding the origin as well, the present embodiment 1 is not influenced even if the reference axes for detection of the position of the own vehicle are set at any positions.

In the route generation device 50A, the steering loaded state detected by the steering loaded state detection unit 1 is inputted to the steering loaded state input unit 4, the position of the parking slot near the vehicle detected by the parking slot position detection unit 2 is inputted to the parking slot position input unit 5, and the present position of the vehicle detected by the vehicle position detection unit. 3 is inputted to the vehicle position input unit 6.

The guidance route generation unit 7 generates a guidance route for guiding the own vehicle 100 to the parking slot 40, on the basis of these pieces of information, i.e., the steering loaded state inputted to the steering loaded state input unit 4, the position of the parking slot near the vehicle inputted to the parking slot position input unit 5, and the position of the vehicle inputted to the vehicle position input unit 6. That is, with the position of the vehicle inputted to the vehicle position input unit being the origin (O), the guidance route generation unit 7 generates a guidance route to be followed until parking is performed in the parking slot 40 defined by the position of the parking slot inputted to the parking slot position input unit 5, and outputs, as a map, target curvatures at the coordinates of respective positions on the guidance route by using the reference axes based on the position of the vehicle inputted to the vehicle position input unit 6.

Here, as the guidance route generated by the guidance route generation unit 7, a guidance route in which static steering is performed or a guidance route in which static steering is not performed is generated through comparison between the steering loaded state inputted to the steering loaded state input unit 4 and a preset threshold value for the steering loaded state. As described above, the steering loaded state inputted to the steering loaded state input unit 4 is represented by the temperature of the EPS motor or the temperature of the EPS-intended ECU. Thus, for example, the phrase "the steering loaded state is high" refers to a state where the temperature of the EPS motor or the temperature of the EPS-intended ECU is high. If the steering loaded state is low, i.e., the temperature of the EPS motor or the temperature of the EPS-intended ECU does not exceed the preset threshold value, a route in which static steering is performed is generated. Meanwhile, if the steering loaded state is high, i.e., the temperature of the EPS motor or the temperature of the EPS-intended ECU exceeds the preset threshold value, a route in which static steering is not performed is generated.

The preset threshold value for the steering loaded state can be arbitrarily set as a temperature for the EPS motor or a temperature for the EPS-intended ECU. For example, a temperature at the time point at which an overheat protection function of the steering is performed only has to be obtained in advance through a simulation or the like by performing static steering several times, and this temperature only has to be set as a threshold value.

Static steering refers to steering performed in a state where the vehicle is stopped. With static steering, a load is applied to the steering, but a high curvature can be obtained in a travel route of the vehicle. Thus, static steering makes it possible to reduce the number of times of turnabout and shorten the time for parking.

Next, a target curvature and a specific generation procedure for a guidance route to be generated by the guidance route generation unit 7 will be described with reference to the drawings by taking, as an example, generation of a guidance route for a parallel parking slot.

Figure 3:
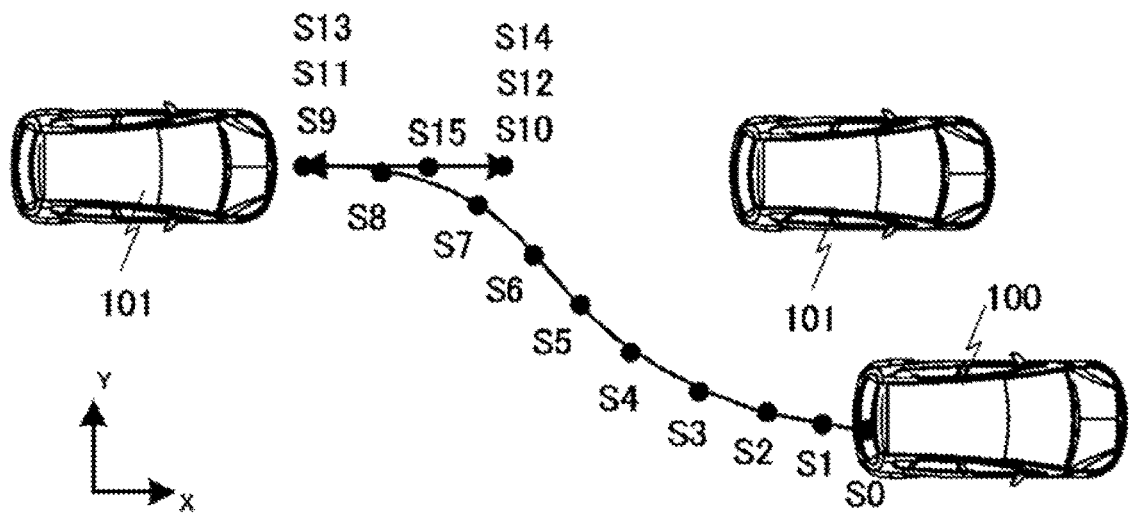
FIG. 3 illustrates position points for explaining an example of generation of a guidance route by the route generation device according to embodiment 1.

FIG. 3 shows a guidance route for guiding the own vehicle 100 to a target parking slot position point S15 in parallel parking. As a reference point for start of parking of the own vehicle 100, the position of the center in the vehicle width direction on the rear wheel axle of the own vehicle is S0. Position points on the guidance route to the final parking slot position point S15 of the own vehicle 100 are defined as S1, S2, . . . and S14 in order.

Figure 4A:
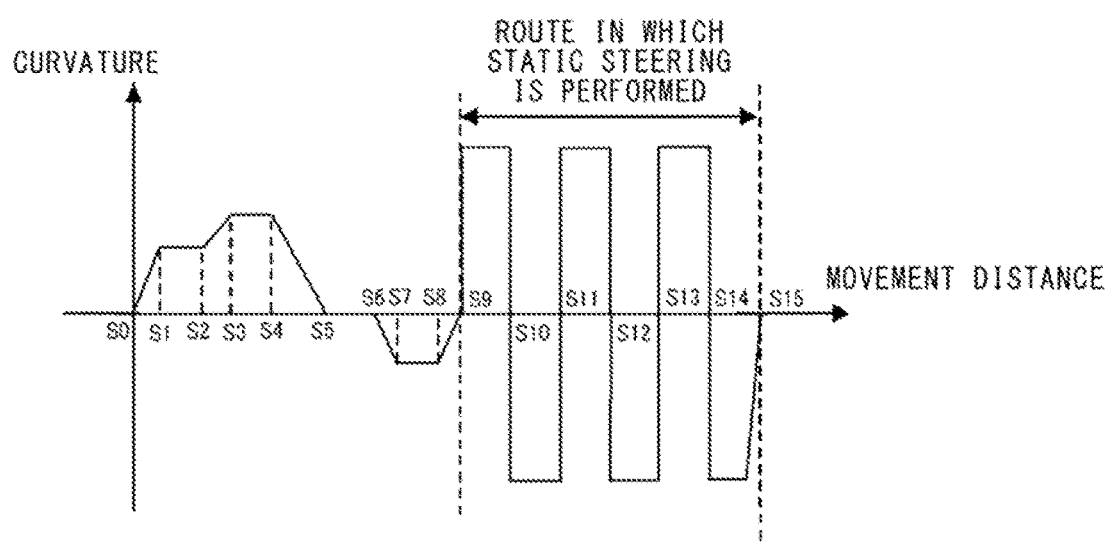
FIG. 4A illustrates changes in target curvature when an own vehicle travels in the case where static steering is used on the guidance route in FIG. 3.
Figure 4B:
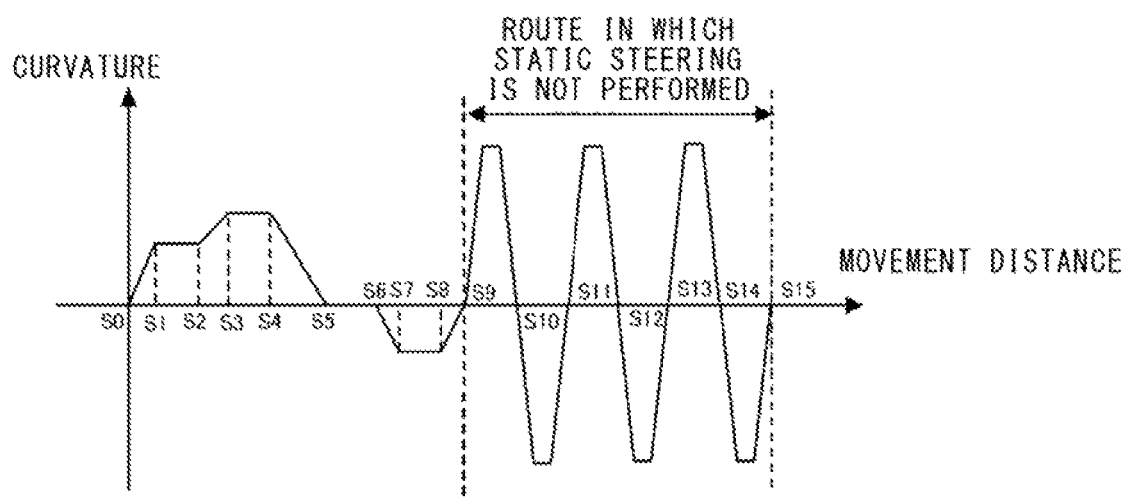
FIG. 4B illustrates changes in target curvature when the own vehicle travels in the case where static steering is not used on the guidance route in FIG. 3.

FIGS. 4A and 43 each show a map indicating changes in target curvature when the own vehicle 100 travels from position point S0 to position point S15 on the guidance route in FIG. 3 outputted by the guidance route generation unit 7. The horizontal axis represents the movement distance of the own vehicle 100, and the vertical axis represents the target curvature at each position point. Here, the curvature is the extent to which the travel route of the vehicle is curved. For example, at the start, of parking, steering starts to be made to the right, from the reference position point S0 in FIG. 3, and thus the curvature gradually increases in FIG. 4A. Between position points S5 and S6, substantially straight traveling is made, and thus the curvature is 0. From position point S6, steering starts to be made to the left, and thus the curvature changes so as to take negative values. FIG. 4A shows a map indicating changes in target curvature in the case where static steering is used, and FIG. 4B shows a map indicating changes in target curvature in the case where static steering is not used.

Figure 5:
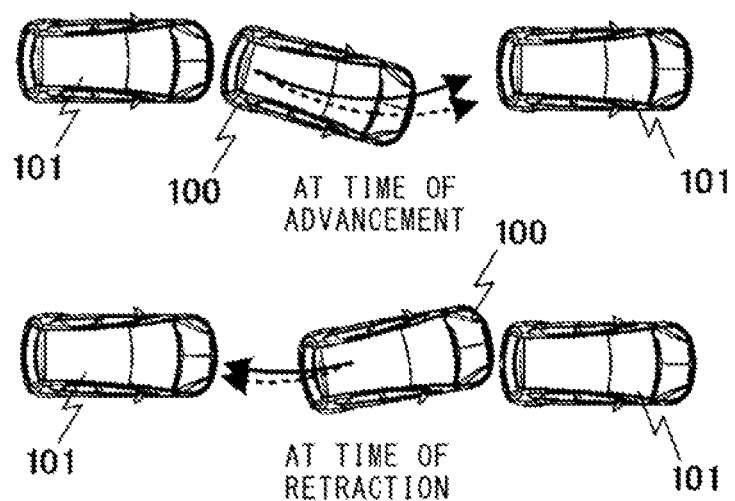
FIG. 5 is a schematic diagram of a guidance route in which static steering is performed and a guidance route in which static steering is not performed, at each of the time of advancement of the vehicle and the time of retraction of the vehicle.

FIG. 5 is a schematic diagram of a guidance route in which static steering is performed and a guidance route in which static steering is not performed, at each of the time of advancement of the vehicle and the time of retraction of the vehicle. The own vehicle 100 moves from position point S1 toward position point S15 in FIG. 3 and moves to position point S15 as the position of the parking slot while performing turnabout from position point S9 to position point S14. FIG. 5 shows an example of routes generated in the case where the steering loaded state inputted to the steering loaded state input unit A is high and in the case where the said steering loaded state is low. In a state where the steering loaded state is low, a guidance route in which static steering is performed is generated from position point S9, and the steering operation is canceled when arrival at parking slot, position point S15 is almost achieved.

Meanwhile, in a state where the steering loaded state is high, a guidance route in which static steering is not performed is generated from position point S9, and steering is canceled when arrival at parking slot position point S15 is almost achieved. Here, the guidance route in which static steering is performed refers to a route in which, as indicated by solid lines in FIG. 5 and by FIG. 4A, steering has already been performed at the time of stoppage of the vehicle, and, with the steering being kept performed, travel is made toward the target parking slot or a turnabout position point. Meanwhile, the guidance route in which static steering is not performed refers to a route in which, as indicated by broken lines in FIG. 5 and by FIG. 4B, steering has not been performed at the time of stoppage of the vehicle, steering is performed at the time of start of travel by the vehicle toward the target parking slot, and steering is canceled near the position of the target parking slot or a turnabout position point. A guidance route may be generated in the same manner also in the case of a perpendicular parking slot. Here, the phrase "steering is performed" means performing a steering operation in a predetermined direction.

Next, an operation of the route generation device 50A will be described with reference to a flowchart in FIG. 6. First, in step ST100, a present position of the own vehicle detected by the vehicle position detection unit 3 is inputted to the vehicle position input unit 6. In step ST101, a position of a parking slot near the own vehicle detected by the parking slot position detection unit 2 is inputted to the parking slot position input unit 5. Than, in step ST102, a steering loaded state detected by the steering loaded state detection unit 1 is inputted. Then, in step ST103, the guidance route generation unit 7 generates a guidance route to the position of the parking slot inputted to the parking slot position input unit 5, with the position of the vehicle inputted to the vehicle position input unit 6 being an origin of the guidance route.

A detailed procedure of the guidance route generation in step ST103 will be described with reference to a flowchart in FIG. 7. First, in step ST201, determination is performed as to whether or not the steering loaded state is high. In the case where determination that the steering loaded state is high, i.e., the temperature of the EPS motor or the temperature of the EPS-intended ECU has exceeded the preset threshold value, is performed in step ST201 (YES in step ST201), the procedure proceeds to step ST202. Meanwhile, in the case where determination that the steering loaded state is low, i.e., the temperature of the EPS motor or the temperature of the EPS-intended ECU has not exceeded the preset, threshold value, is performed (NO in step ST201), the procedure proceeds to step ST203.

In step ST202, a route in which static steering is not performed such as the route in FIG. 4B, is generated. Meanwhile, in step ST203, a route in which static steering is performed such as the route in FIG. 4A, is generated. That is, the guidance route generation unit 7 can generate a guidance route that includes information about whether static steering can be performed, in addition to information about the position of the vehicle inputted to the vehicle position input unit 6 and information about the position of the parking slot inputted to the parking slot position input unit 5.

The route generation device according to the present embodiment 1 may further include a number-of-times-of-static-steering upper limit calculation unit which calculates a number-of-times-of-static-steering upper limit on the basis of the steering loaded state inputted to the steering loaded state input unit 4, and a guidance route may be generated on the basis of the number-of-times-of-static-steering upper limit.

Figure 8:
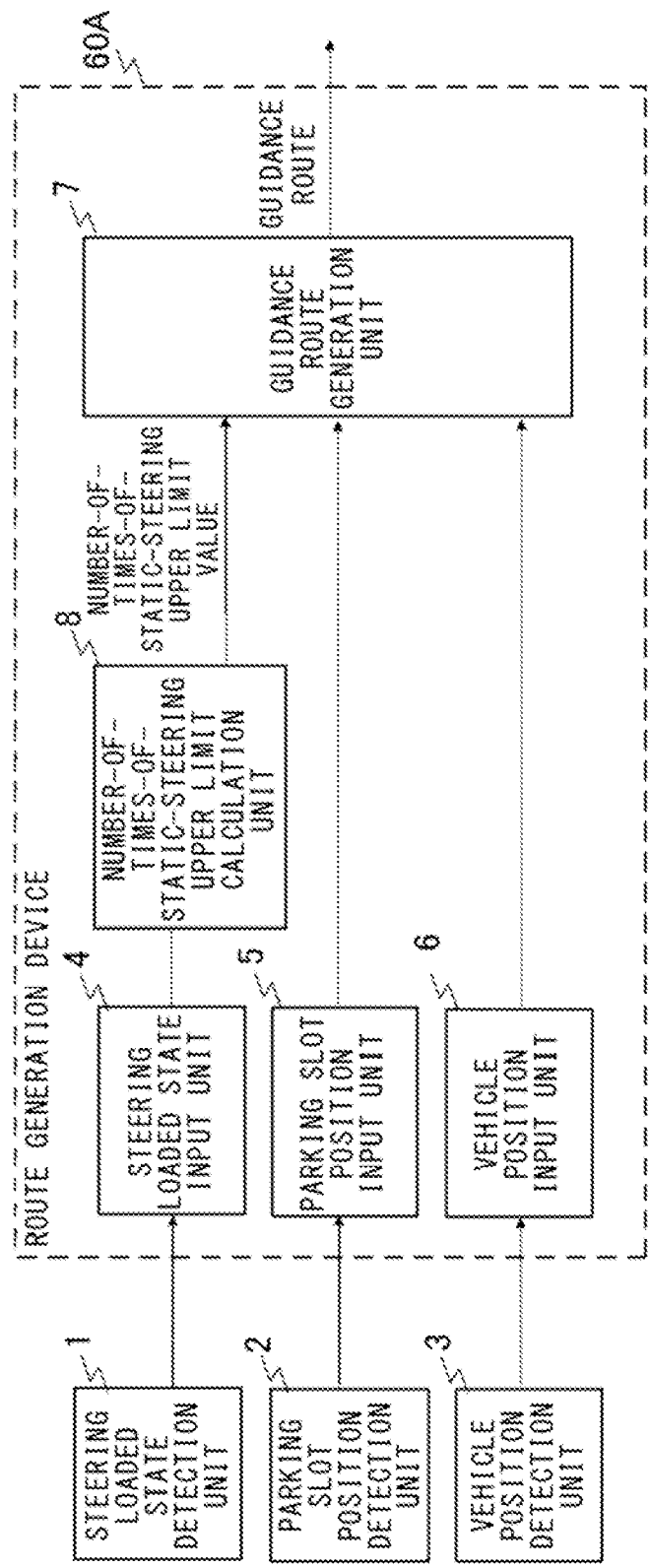
FIG. 8 is a block diagram showing another configuration of the route generation device according to embodiment 1.

FIG. 8 is a block diagram showing another configuration of the route generation device according to the present embodiment 1. In this configuration, a number-of-times-of-static-steering upper limit calculation unit 8 is further provided in addition to the components of the route generation device in FIG. 1.

In FIG. 8, a route generation device 60A includes the number-of-times-of-static-steering upper limit calculation unit 8 which calculates, on the basis of the steering loaded state inputted to the steering loaded state input unit 4, a number-of-times-of-static-steering upper limit value which is the number of times up to which static steering can be performed on the guidance route to the end of parking, and outputs the number-of-times-of-static-steering upper limit value. A method for calculating a number-of-times-of-static-steering upper limit value will be described with reference to FIG. 9.

FIG. 9 illustrates an example of the relationship between steering loaded state and number-of-times-of-static-steering upper limit value. Here, description will be given by taking, as an example of the steering loaded state, the temperature of the EPS motor. In the table shown in FIG. 9, the number-of-times-of-static-steering upper limit value is set to be smaller as the temperature of the EPS motor is higher. The table is predetermined through a simulation or the like and stored in a storage device inside the route generation device 60A. The number-of-times-of-static-steering upper limit calculation unit 8 performs comparison between the table in FIG. 9 and the present steering loaded state (here, the temperature of the EPS motor) inputted to the steering loaded state input unit 4, and outputs a number-of-times-of-static-steering upper limit value. For example, if the present temperature of the EPS motor is 43° C., "5 times" is outputted as the number-of-times-of-static-steering upper limit value since, in the table in FIG. 9, the number-of-times-of-static-steering upper limit is "5 times" in the case of being not lower than 40° C. and lower than 45° C.

Although description has been given with an example in which the temperature of the EPS motor is used as the steering loaded state, the temperature of the EPS-intended ECU may be used as the steering loaded state. Alternatively, by using both temperatures, the number of times of static steering may be calculated from each of the temperatures, and the number that takes a smaller value may be determined as a number-of-times-of-static-steering upper limit value.

The guidance route generation unit 7 generates a guidance route for guidance to the parking slot on the basis of the number-of-times-of-static-steering upper limit value calculated and outputted by the number-of-times-of-static-steering upper limit calculation unit 8, the position of the parking slot near the vehicle inputted to the parking slot position input unit 5, and the position of the vehicle inputted to the vehicle position input unit 6. The guidance route generation is as follows. That is, guidance routes in which static steering is performed are generated until the number of times of turnabout of the vehicle until arrival at the position of the parking slot, arrives at the number-of-times-of-static-steering upper limit value outputted by the number-of-times-of-static-steering upper limit calculation unit 8. Meanwhile, guidance routes in which static steering is not performed are generated from the position point at which the number of times of turnabout of the vehicle exceeds the number-of-times-of-static-steering upper limit value.

Next, an example in which a guidance route is generated by the guidance route generation unit 7 of the route generation device 60A including the number-of-times-of-static-steering upper limit calculation unit 8 will be described by taking, as an example, the parallel parking slot in FIG. 3.

Figure 10:
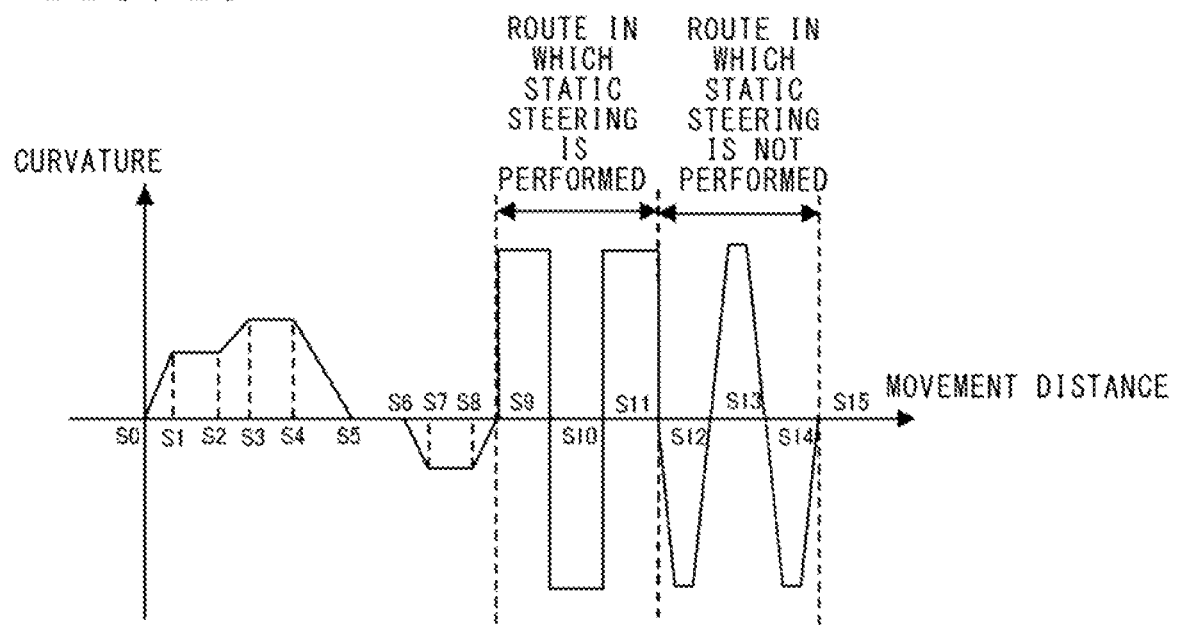
FIG. 10 illustrates changes in target curvature when the own vehicle travels on the guidance route in FIG. 3 outputted by the guidance route generation unit of the route generation device in FIG. 8.

FIG. 10 shows a map indicating changes in the target curvature outputted by the guidance route generation unit 7, when the own vehicle 100 travels from position point S0 to position point S15 on the guidance route in FIG. 3. The own vehicle 100 moves from position point S1 toward position point S15 and moves to position point S15 as the position of the parking slot, while performing turnabout from position point S9 to position point S14. Here, it is assumed that the number-of-times-of-static-steering upper limit value outputted by the number-of-times-of-static-steering upper limit calculation unit 8 is "4 times". At position point S9 at which the own vehicle 100 starts turnabout, the turnabout is performed for the first time, and thus the number of times of turnabout is 1. Guidance routes in which static steering is performed are generated from position point S9 to position point S12 at which the number of times of turnabout of the own vehicle 100 does not exceed 4 which is the number-of-times-of-static-steering upper limit value. Meanwhile, guidance routes in which static steering is not performed are generated from position point S13 to position point S15. At position point S13, the number of times of turnabout of the own vehicle 100 exceeds 4 which is the number-of-times-of-static-steering upper limit value, i.e., the turnabout is performed for the fifth time. A guidance route may be generated in the same manner also in the case of a perpendicular parking slot.

An operation of the route generation device 60A in FIG. 3 will be described with reference to a flowchart. In the flowchart in FIG. 11, step ST104 is added between step ST102 and step ST103, and furthermore, the operation in step ST103 is different, as compared to the flowchart in FIG. 6.

In step ST104, the number-of-times-of-static-steering upper limit calculation unit 8 calculates a number-of-times-of-static-steering upper limit value for parking on the basis of the steering loaded state inputted by the steering loaded state input unit 4, and outputs the number-of-times-of-static-steering upper limit value. Then, in step ST103, a guidance route for which the number-of-times-of-static-steering upper limit value has been considered, is generated.

Figure 11:
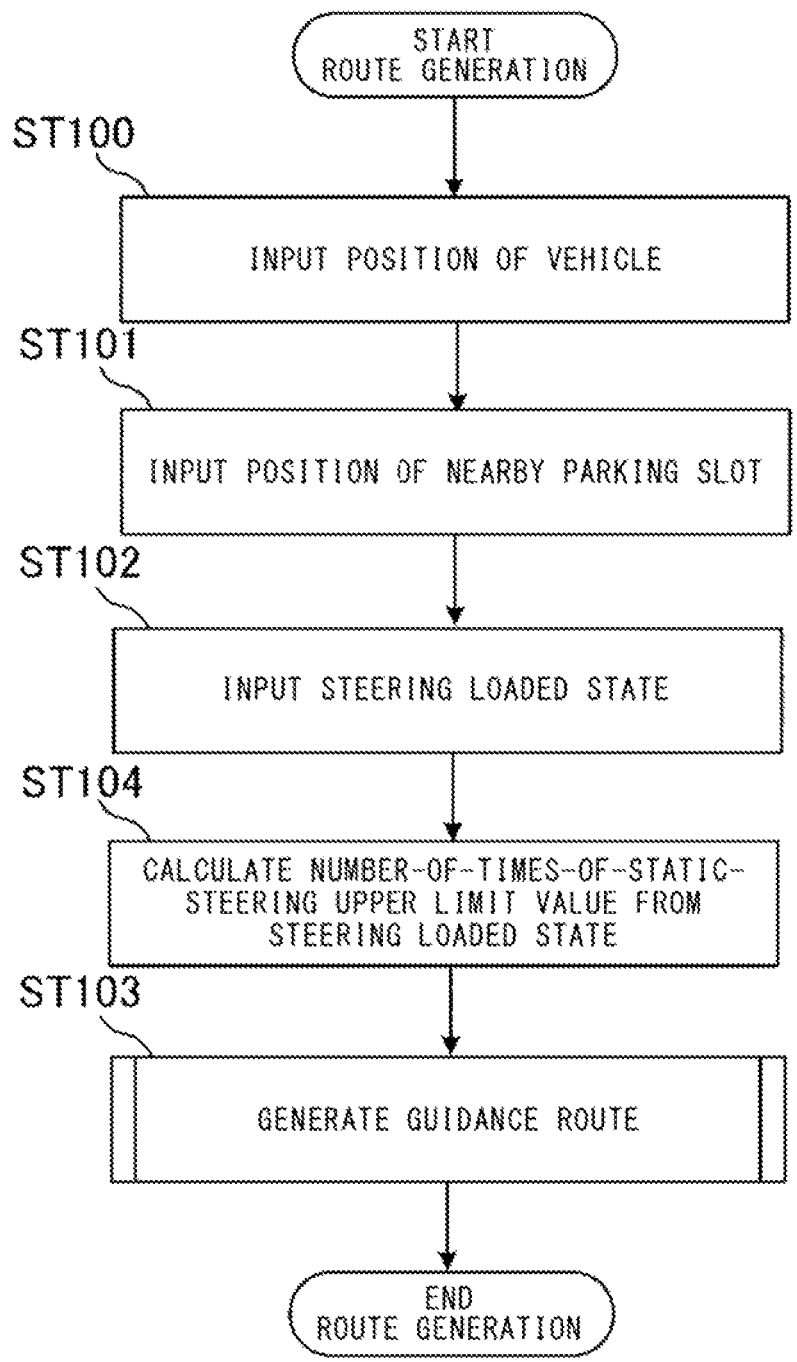
Figure 12:
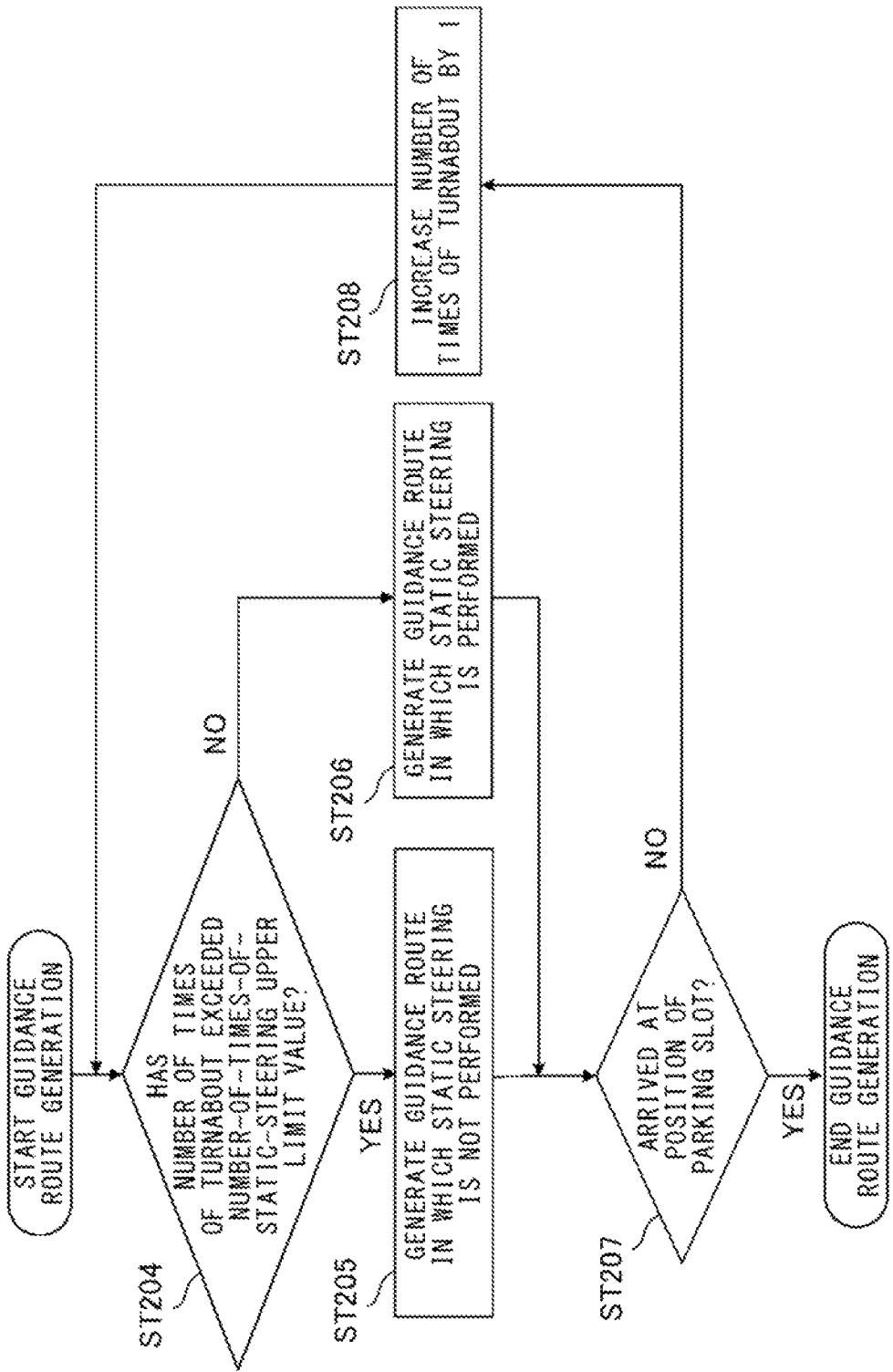
FIG. 12 is a flowchart showing an operation of the guidance route generation unit of the route generation device in FIG. 8.

Next, a detailed procedure of the guidance route generation in step ST103 in FIG. 11 will be described with reference to a flowchart in FIG. 12. First, in step ST204, determination is performed as to whether or not the number of times of turnabout has exceeded the number-of-times-of-static-steering upper limit value. In the case where the number has exceeded the number-of-times-of-static-steering upper limit value, the procedure proceeds to step ST205. Meanwhile, in the case where the number has not exceeded the number-of-times-of-static-steering upper limit value, the procedure proceeds to step ST206.

In step ST205, a guidance route in which static steering is not performed such as a guidance route in FIG. 10, is generated. Meanwhile, in step ST206, a guidance route in which static steering is performed such as a guidance route in FIG. 10, is generated.

Then, in step ST207, determination is performed as to whether or not arrival at the position of the parking slot on the route has been achieved. In the case where the arrival has been achieved, the guidance route generation is ended. Meanwhile, in the case where the arrival has not been achieved, the procedure proceeds to step ST208.

In step ST208, the number of times of turnabout is increased by 1. Then, determination in step ST204 is performed again, and a guidance route is generated.

For example, it is assumed that the number-of-times-of-static-steering upper limit value outputted by the number-of-times-of-static-steering upper limit calculation unit 8 is "4 times". In FIG. 3, at position point S9 at which the own vehicle 100 starts turnabout, the turnabout is performed for the first time, and thus the number of times of turnabout is 1. Thus, in step ST204, the number of times of turnabout has not exceeded the number-of-times-of-static-steering upper limit value (NO), and thus the procedure proceeds to step ST206 in which a guidance route in which static steering is performed is generated. Since position point S9 is not the position of the parking slot, the procedure proceeds from step ST207 to step ST208 in which the number of times of turnabout is increased by 1. Then, the procedure returns to step ST204 again. From position point S9 to position point S12, the number of times of turnabout of the own vehicle 100 does not exceed 4 which is the number-of-times-of-static-steering upper limit value, and thus step ST206, step ST207, and step ST208 are repeated in this order.

Position point S13 is a position point at which the number of times of turnabout of the own vehicle 100 exceeds 4 which is the number-of-times-of-static-steering upper limit value, i.e., the turnabout is performed for the fifth time. At position point S13, since the number of times of turnabout has exceeded the number-of-times-of-static-steering upper limit value in step ST204 (YES), the procedure proceeds to step ST205 in which a guidance route in which static steering is not performed is generated. Since position point S13 is not the position of the parking slot, the procedure proceeds from step ST207 to step ST208 in which the number of times of turnabout is increased by 1. Then, the procedure returns to step ST204 again. From position point S13 to position point S15, guidance routes in which static steering is not performed are generated.

Even at position point S15, in the case where the position of the own vehicle inputted to the vehicle position input unit 6 does not coincide with the position of the parking slot at this point in step ST207, the procedure proceeds to step ST208 in which the number of times of turnabout is increased by 1, Then, the procedure returns to step ST204 again. In the route generation device 60A according to the present embodiment, the number-of-times-of-static-steering upper limit value is calculated in advance. Thus, even if position point S15 which is a preset position of a parking slot is exceeded, computation does not need to be made as to whether or not static steering can be performed.

Figure 13:
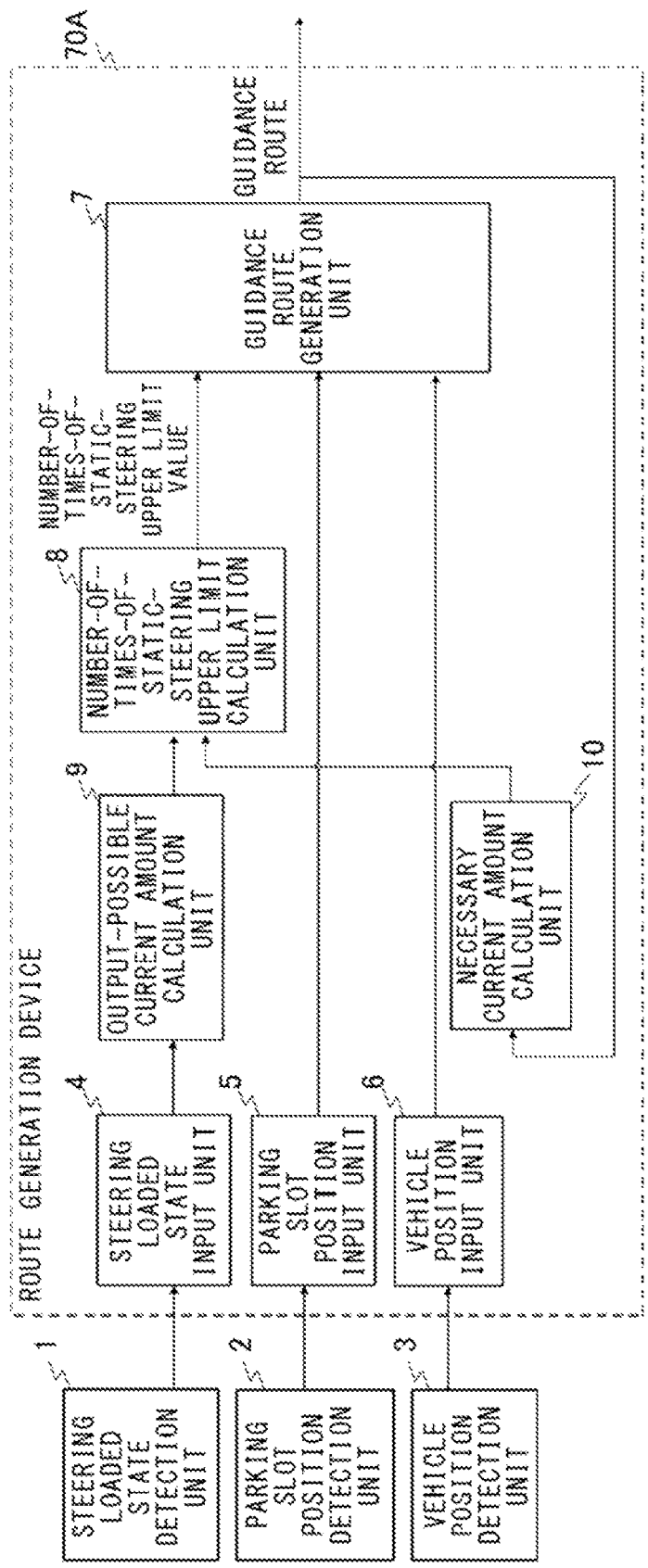
FIG. 13 is a block diagram showing still another configuration of the route generation device according to embodiment 1.

FIG. 13 is a block diagram showing still another configuration of the route generation device according to the present embodiment 1. As compared to the route generation device 60A in FIG. 3, a route generation device 70A in FIG. 13 further includes: an output-possible current amount calculation unit 9 which calculates, on the basis of the steering loaded state inputted by the steering loaded state input unit 4, an output-possible current amount which is the amount of current capable of being outputted during steering control; and a necessary current amount calculation unit 10 which calculates, on the basis of a guidance route outputted from the guidance route generation unit 7, an amount of current necessary for travel on the guidance route during steering control. Then, the number-of-times-of-static-steering upper limit calculation unit 8 calculates a number-of-times-of-static-steering upper limit value on the basis of the output-possible current amount outputted from the output possible current amount calculation unit 9 and the necessary current amount outputted from the necessary current amount calculation unit 10, and outputs the number-of-times-of-static-steering upper limit value. The guidance route generation unit 7 generates a guidance route on the basis of the number-of-times-of-static-steering upper limit value outputted from the number-of-times-of-static-steering upper limit calculation unit 8.

The amount of current capable of being outputted during steering control calculated by the output-possible current amount calculation unit 9 will be described with reference to FIG. 14.

Figure 14:
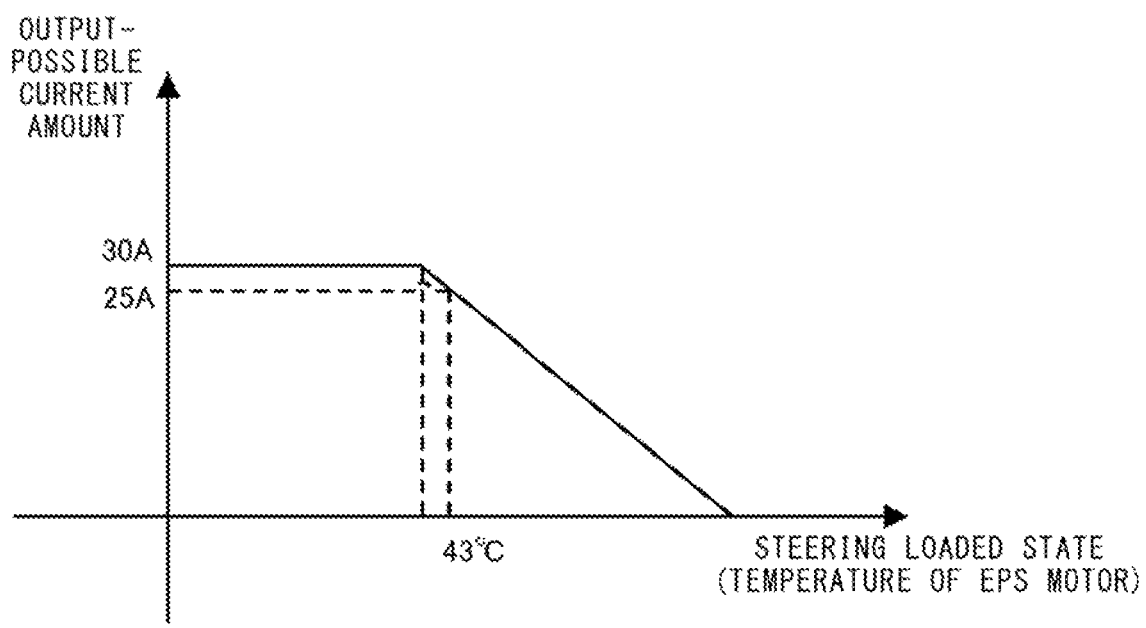
FIG. 14 illustrates an example of the relationship between steering loaded state and output-possible current amount.

FIG. 14 illustrates an example of the relationship between steering loaded state and output-possible current amount. The drawing shows that setting is made such that: the output-possible current amount is the maximum current amount capable of being attained by the EPS until the steering loaded state takes a certain value, i.e., the temperature of the EPS motor or the temperature of the EPS-intended ECU becomes a predetermined temperature; and, when the steering loaded state increases to exceed the certain state, the output-possible current amount gradually decreases. In the example in the drawing, the maximum current amount is set to 30 A. This diagram indicating the relationship is predetermined through a simulation or the like and stored in a storage device or the like. The output-possible current amount is calculated through checking with the present steering loaded state and the diagram indicating the relationship between steering loaded state and output-possible current amount.

In FIG. 14, the temperature of the EPS motor is taken as an example of the present steering loaded state, and, when the temperature of the EPS motor is 43° C., the output-possible current is 25 A in the graph, and thus 25 A is outputted as the output-possible current, amount. As the present steering loaded state, the temperature of the EPS-intended ECU may be used, or both the temperature of the EPS motor and the temperature of the EPS-intended ECU may be used. In the case of using both temperatures, a smaller one of calculated output-possible currents only has to be outputted to the number-of-times-of-static-steering upper limit calculation unit 8.

The necessary current amount calculation unit 10 calculates an amount of current necessary for the vehicle to perform steering control from the position of the vehicle to the position of the parking slot. Specifically, the necessary current amount calculation unit 10 calculates an amount of current necessary for performing steering control at the time of travel on a guidance route generated by the guidance route generation unit 7. The necessary current amount is calculated as the amount of current necessary for travel on the guidance route obtained by the guidance route generation unit 1, when static steering is performed in full at the turnabout position points from the position of the vehicle inputted to the vehicle position input unit 6 to the position of the parking slot inputted to the parking slot position input unit 5.

A method for calculating the necessary current amount may be an arbitrarily selected method, and an example of the calculation method will be described below.

Figure 15:
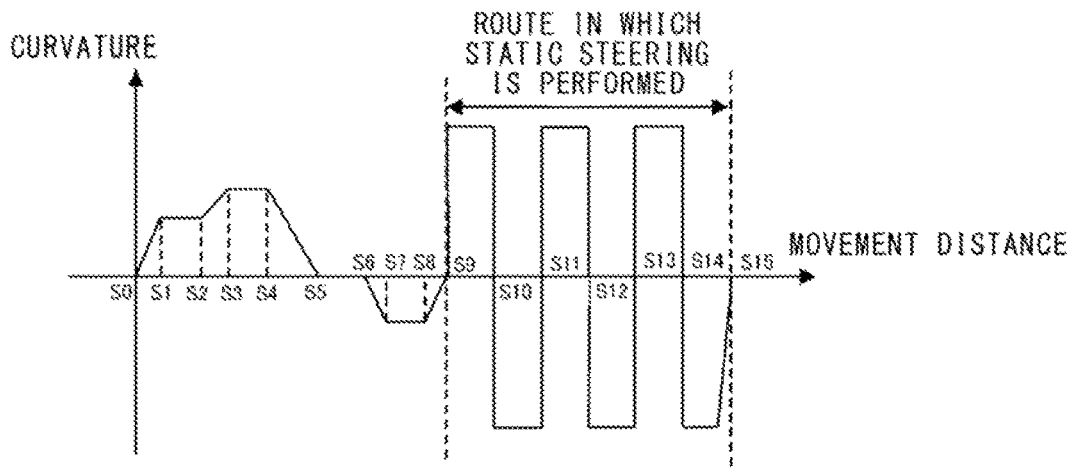
FIG. 15 illustrates changes in target curvature and changes in the amount of current necessary for steering control, when the own vehicle travels on the guidance route in FIG. 3 outputted by the guidance route generation unit of the route generation device in FIG. 13.

FIG. 15 illustrates changes in the target curvature at which the own vehicle 100 travels, and changes in the amount of current necessary for steering control, in the case of performing static steering in full at the turnabout position points from position point S0 to position point S15 on the guidance route in FIG. 3 outputted by the guidance route generation unit 7. The necessary current amount is obtained as follows. That is, from each curvature in FIG. 15, a steering amount at the corresponding position point is calculated, and a current amount at the position point is calculated from the steering amount. Then, the calculated current amounts at the respective position points are integrated, to calculate and output an amount of current necessary for travel on the guidance route in the case of performing static steering in full from position point S0 which is the position of the vehicle inputted to the vehicle position input unit 6 to position point S15 which is the position of the parking slot inputted to the parking slot position input unit 5.

The number-of-times-of-static-steering upper limit calculation unit 8 calculates a number-of-times-of-static-steering upper limit value on the basis of the output-possible current amount outputted from the output-possible current amount calculation unit 9 and the necessary current amount outputted from the necessary current amount calculation unit 10. A method for calculating the number-of-times-of-static-steering upper limit value from the output-possible current amount and the necessary current amount will be described with reference to FIG. 16.

Figure 16:
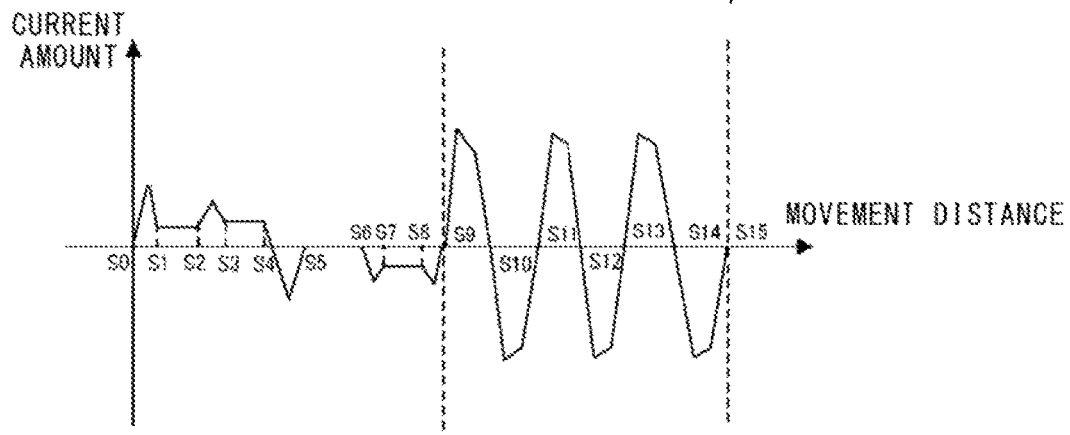
FIG. 16 illustrates an example of the relationship between output-possible current amount and necessary current amount.

FIG. 16 illustrates an example of the relationship among output-possible current amount, necessary current amount, and number-of-times-of-static-steering upper limit value (number of times). In the drawing, each number-of-times-of-static-steering upper limit value (number of times) is present at the intersection between the corresponding output-possible current amount and necessary current amount. As the output-possible current amount becomes larger and as the necessary current amount becomes smaller, the steering loaded state at the time of travel on the guidance route becomes lower so that the number-of-times-of-static-steering upper limit value is set to be larger. Meanwhile, with the same output-possible current, as the necessary current amount becomes larger, the steering loaded state at; the time of travel on the guidance route becomes higher so that the number-of-times-of-static-steering upper limit value is set to be smaller. The table (shown in FIG. 16) indicating the relationship among output-possible current amount, necessary current amount, and number-of-times-of-static-steering upper limit value (number of times), is predetermined through a simulation or the like and stored in a storage device.

The number-of-times-of-static-steering upper limit calculation unit 8 calculates a number-of-times-of-static-steering upper limit value through checking with the output-possible current amount, outputted, from the output-possible current amount calculation unit 9 and the necessary current amount outputted from the necessary current amount calculation unit 10. For example, if the output-possible current amount is 27

A and the necessary current amount is 3.5 A, the number-of-times-of-static-steering upper limit calculation unit 8 outputs "6 times" as the number-of-times-of-static-steering upper limit value since the number-of-times-of-static-steering upper limit at which the output-possible current amount is 27 A and the necessary current amount is not smaller than 3 A and smaller than 4 A, is "6 times" as indicated by a circle in the table in FIG. 16.

An operation of the route generation device 70A in FIG. 13 will be described with reference to a flowchart. In the flowchart in FIG. 17, step ST105 to step ST108 are added between step ST102 and step ST103, and furthermore, the operation in step ST103 is different, as compared to the flowchart in FIG. 6. Step ST100 to step ST102 are the same operations as those in the flowchart in FIG. 6.

In step ST105, the output-possible current amount calculation unit 9 calculates, on the basis of the steering loaded state inputted to the steering loaded state input unit 4, an amount of current capable of being outputted during steering control.

In step ST106, the guidance route generation unit 7 generates, on the basis of the position of the vehicle inputted to the vehicle position input unit 6 and the position of the parking slot inputted to the parking slot position input unit 5, a provisional guidance route obtained in the case of performing static steering in full at the turnabout position points from the position of the vehicle to the position of the parking slot.

In step ST107, the necessary current amount calculation unit 10 calculates, from the guidance route generated in step ST106, an amount of current necessary for steering control for travel on the guidance route as a necessary current amount.

In step ST107, the number-of-times-of-static-steering upper limit calculation unit 8 calculates a number-of-times-of-static-steering upper limit value on the basis of the output-possible current amount calculated in step ST105 and the necessary current amount calculated in step ST107.

In step ST103, the guidance route generation unit 7 generates a guidance route on the basis of the number-of-times-of-static-steering upper limit value calculated in step ST108, and outputs the guidance route. The outputted guidance route corresponds to a guidance route obtained by updating the provisional guidance route generated in ST106.

Figure 17:
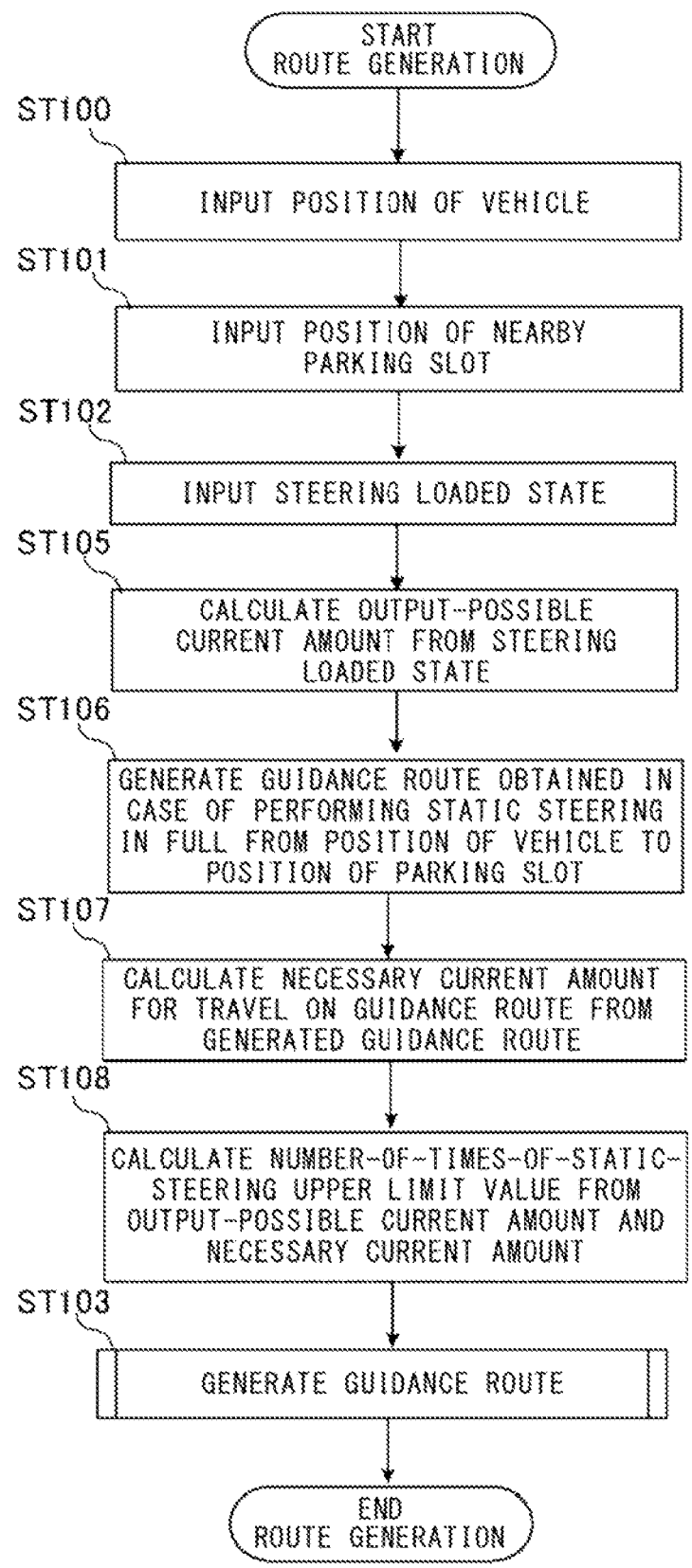
FIG. 17 is a flowchart showing an operation of the route generation device in FIG. 13.
Figure 18:
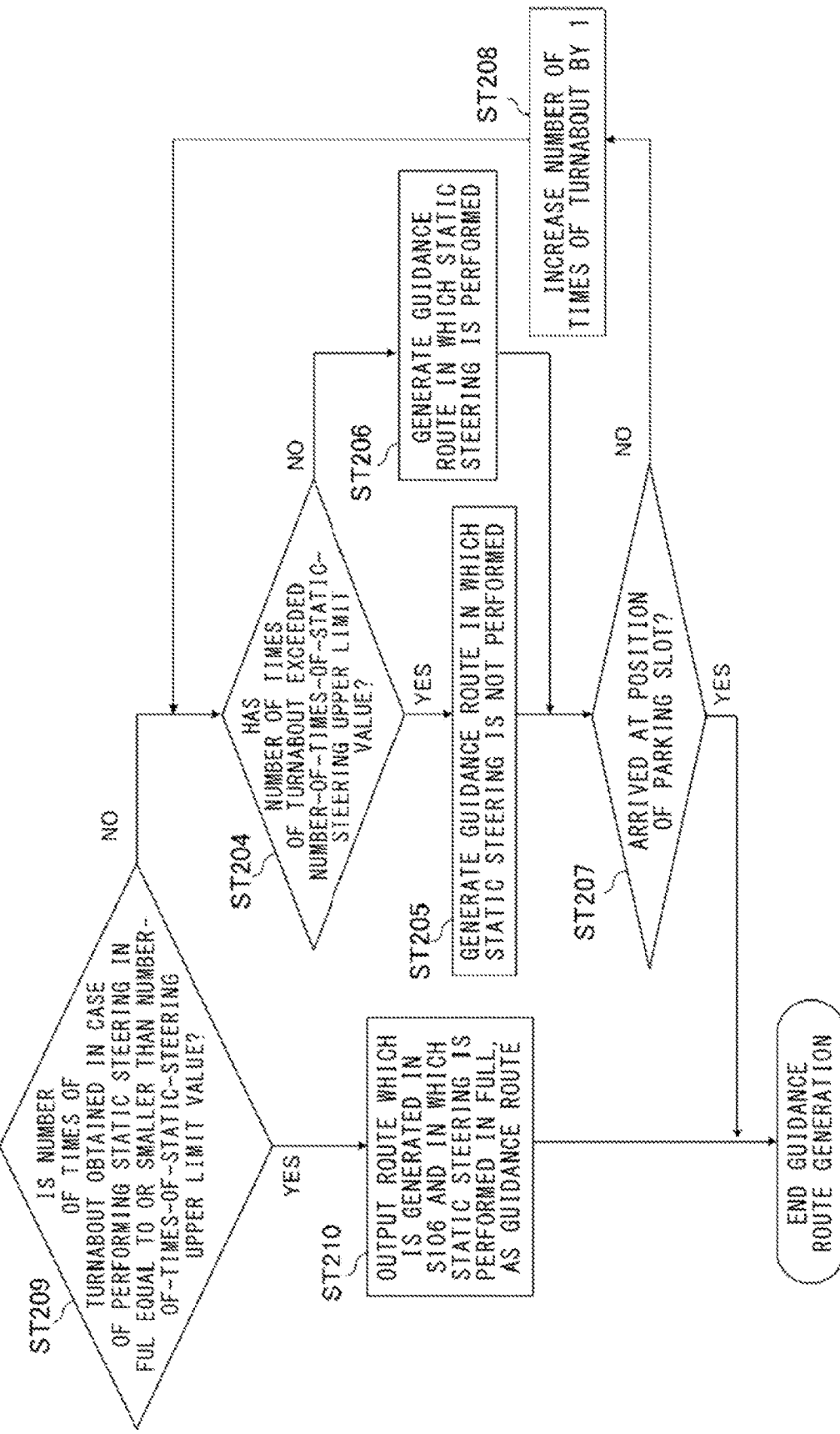
FIG. 18 is a flowchart showing an operation of the guidance route generation unit of the route generation device in FIG. 13.

Next, a detailed procedure of the guidance route generation in step ST103 in FIG. 17 will be described with reference to a flowchart in FIG. 18.

First, in step ST209, determination is performed as to whether or not the number of times of static steering on the guidance route which has been generated in step ST106 and which is obtained in the case of performing static steering in full from the position of the vehicle to the position of the parking slot is equal to or smaller than the number-of-times-of-static-steering upper limit value calculated in step ST108. In the case where the number of times of static steering in full is equal to or smaller than the number-of-times-of-static-steering upper limit value (YES in step ST209), the procedure proceeds to step ST210. Meanwhile, in the case where the number of times of static steering in full is larger than the number-of-times-of-static-steering upper limit value (NO in step ST209), the procedure proceeds to step ST204.

In step ST210, the number of times of static steering on the guidance route which has been generated in step ST106 and which is obtained in the case of performing static steering in full from the position of the vehicle to the position of the parking slot is equal to or smaller than the number-of-times-of-static-steering upper limit value calculated in step ST108. Thus, the guidance route generation unit 7 outputs, as a guidance route, the route which has been generated in step ST106 and in which static steering is performed in full.

Meanwhile, in the case where determination of "NO" is performed in step ST209, i.e., the number of times of static steering on the guidance route which has been generated in step ST106 and which is obtained in the case of performing static steering in full from the position of the vehicle to the position of the parking slot is larger than the number-of-times-of-static-steering upper limit value calculated in step ST108, the procedure proceeds to step ST204. The steps from step ST204 to step ST208 are the same as the steps from step ST204 to step ST208 in FIG. 12. That is, routes in which static steering is performed are outputted as guidance routes until arrival at the number-of-times-of-static-steering upper limit value, and routes in which static steering is not performed, are outputted as guidance routes from the turnabout position point at which the number-of-times-of-static-steering upper limit value has been exceeded.

Next, a parking assist, apparatus in which the above route generation device is used, will be described.

Figure 19:
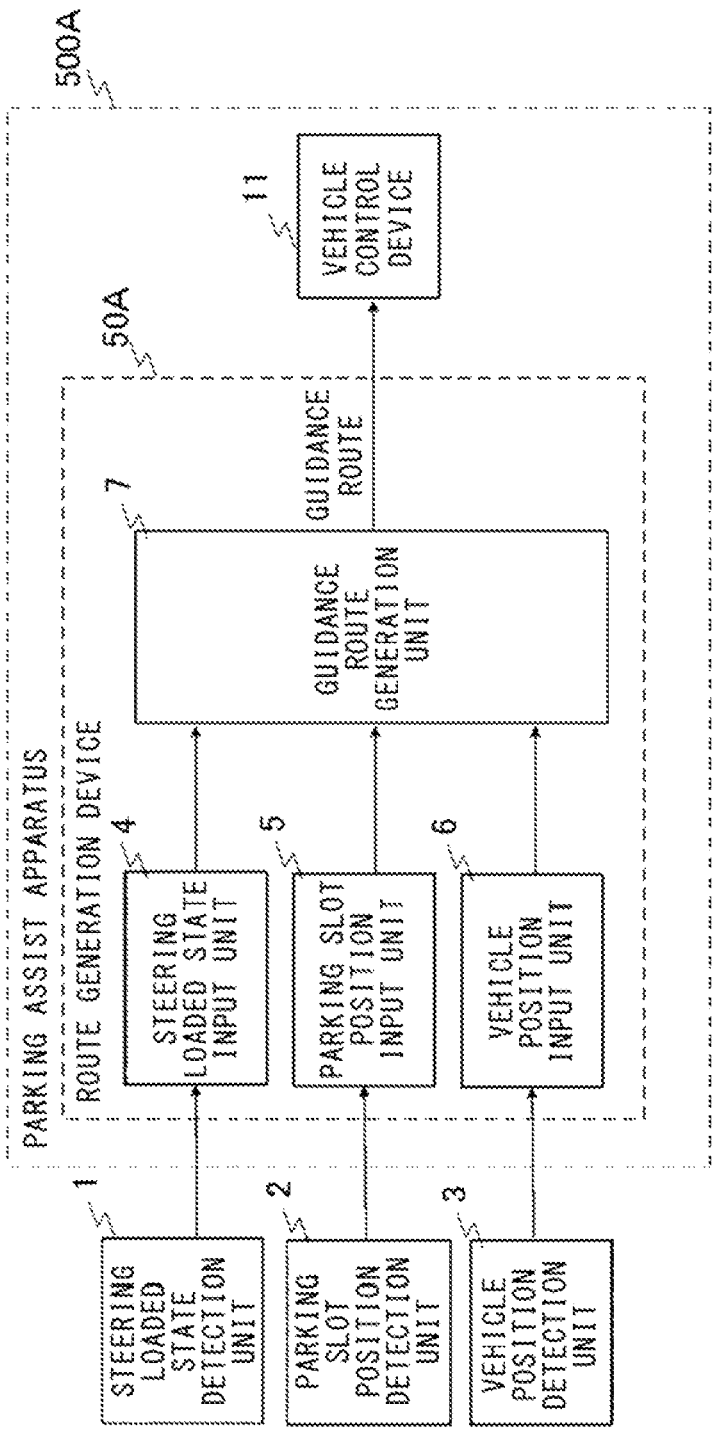
FIG. 19 is a block diagram showing a configuration of a parking assist apparatus according to embodiment 1.

FIG. 19 is a block diagram showing a configuration of a parking assist apparatus according to the present embodiment 1. A configuration of a parking assist apparatus 500A obtained by further providing a vehicle control device 11 to the configuration of the route generation device 50A in FIG. 1, is shown.

The vehicle control device 11 performs vehicle control to park the vehicle in the parking slot, on the basis of the guidance route outputted from the guidance route generation unit 7 of the route generation device 50A. The vehicle control device 11 calculates, according to the map indicating changes in target curvature and generated by the guidance route generation unit 7, a target steering-wheel steering amount to park the vehicle in the parking slot.

In this manner, the vehicle control device which causes the vehicle to be parked in the parking slot on the basis of the guidance route outputted from the guidance route generation unit 7 of the route generation device 50A is provided to the route generation device 50A, whereby the resultant, apparatus can be caused to function as a parking assist apparatus.

Figure 20:
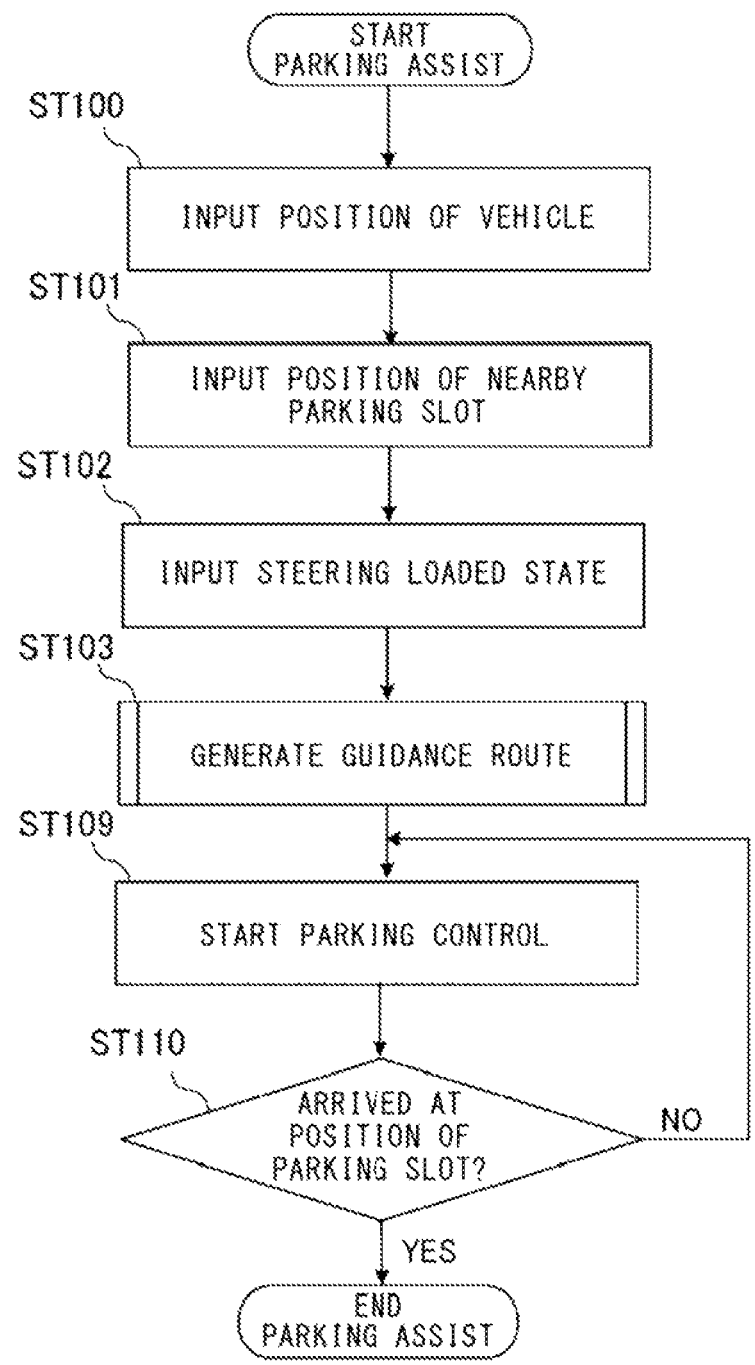
FIG. 20 is a flowchart showing an operation of the parking assist apparatus in FIG. 19.

An operation of the parking assist apparatus 500A in FIG. 19 will be described with reference to a flowchart in FIG. 20. In the flowchart in FIG. 20, step ST109 and step ST110 are added subsequently to step ST103, as compared to the flowchart in FIG. 6. The operations in steps from step ST100 to step ST103 are the same operations as those described in FIG. 6.

In step ST109, parking control is started on the basis of the guidance route generated in step ST103. In step ST110, determination is performed as to whether or not the vehicle has arrived at the position of the target parking slot. In the case where the arrival has been achieved (YES), the parking assist operation is ended. Meanwhile, in the case where the arrival has not been achieved (NO), the procedure returns to step ST109, and the guidance operation is continuously performed until the parking assist is completed.

The parking assist apparatus 500A may further include the steering loaded state detection unit 1, the parking slot position detection unit 2, and the vehicle position detection unit 3, and the resultant apparatus may be mounted as one module to the own vehicle.

Although an example in which the route generation device 50A in FIG. 1 is used for the above parking assist apparatus 500A has been described, it is needless to say that the route generation device 60A in FIG. 3 or the route generation device 70A in FIG. 13 can be used therefor.

Although the above parking assist apparatus 500A includes the vehicle control device which causes the vehicle to be parked in the parking slot on the basis of the guidance route outputted from the route generation device, a device which reports, to a vehicle, the guidance route outputted from the route generation device may be included.

Figure 21:
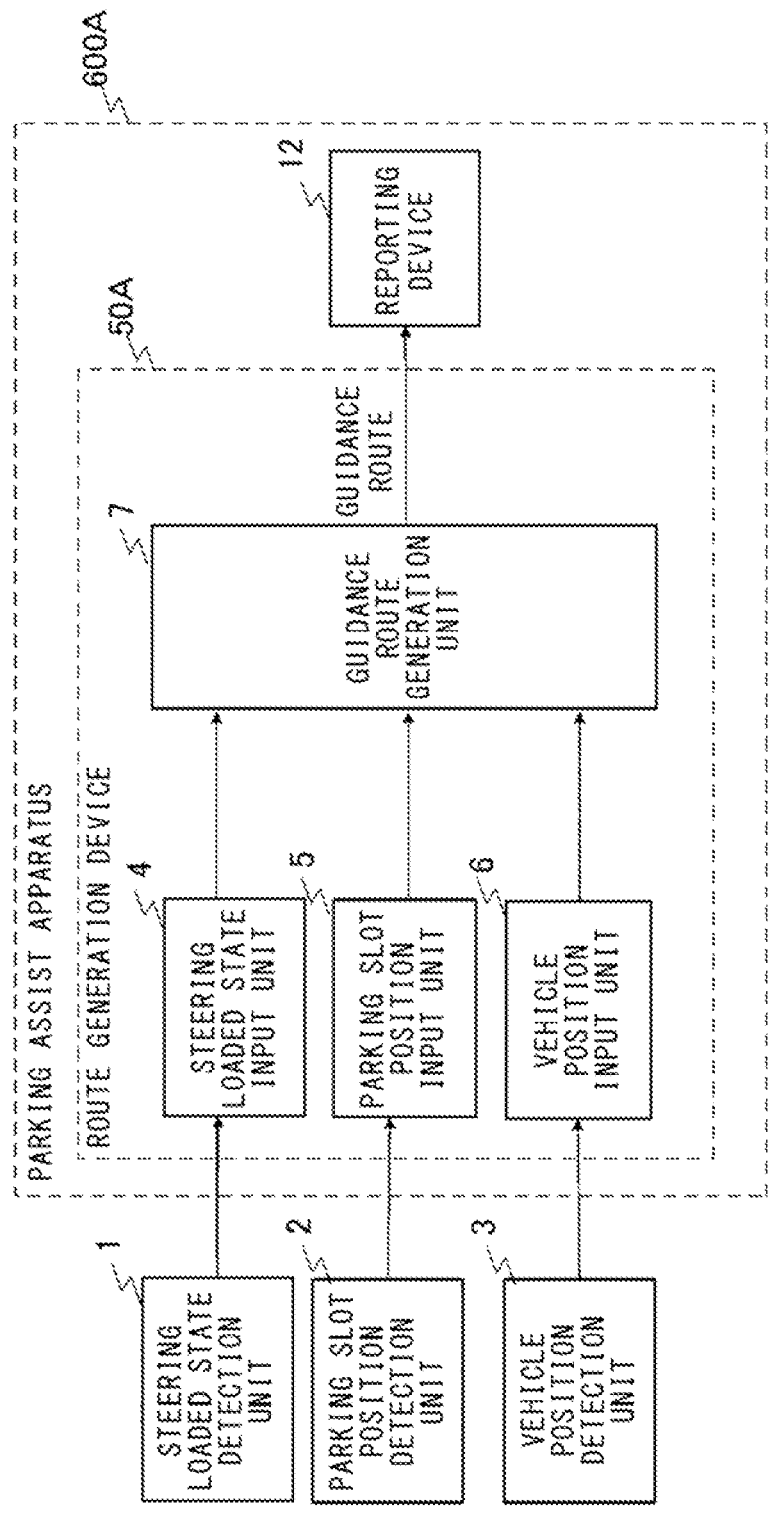
FIG. 21 is a flowchart showing an operation of the route generation device in FIG. 8.

FIG. 21 is a block diagram showing another configuration of the parking assist apparatus according to embodiment 1 and shows a configuration of a parking assist apparatus 600A obtained by further providing a reporting device 12 to the configuration of the route generation device 50A in FIG. 1.

The reporting device 12 reports, to a vehicle to be parked in a predetermined parking slot, the guidance route outputted from the guidance route generation unit 7. That is, the parking assist apparatus 600A is disposed outside of a vehicle and can be used as, for example, a parking assist, apparatus of a control system in an automatic valet parking system in which automatic travel to an assigned parking slot is performed and parking therein is automatically performed without driving by a user.

A method for the reporting may be an arbitrarily selected method. For example, in the case of use in the automatic valet parking system, a transmitter using a wireless local area network (LAN) such as Wi-Fi (registered trademark) only has to be disposed in the control system and transmit pieces of information about guidance routes to respective vehicles.

An operation of the parking assist apparatus 600A in FIG. 21 will be described with reference to a flowchart shown in FIG. 22. In the flowchart in FIG. 22, step ST111 is added subsequently to step ST103, as compared to the flowchart in FIG. 6.

Figure 6:
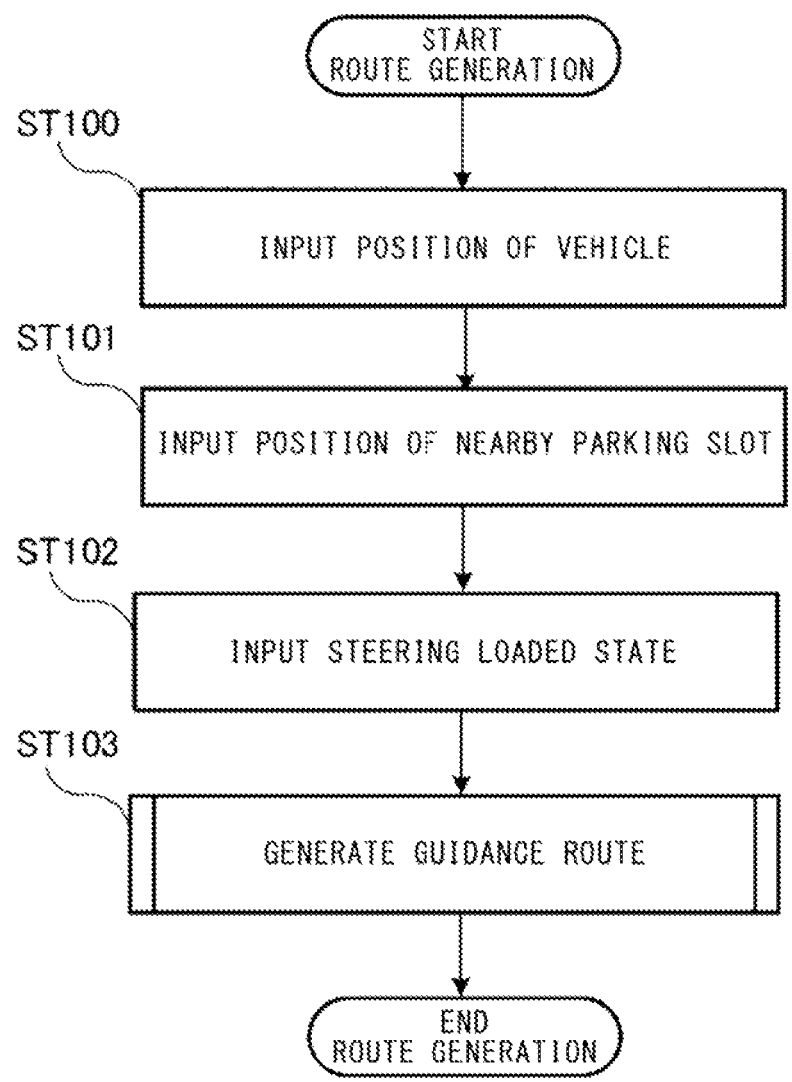
FIG. 6 is a flowchart showing an operation of the route generation device according to embodiment 1.

The operations in steps from step ST100 to step ST103 are the same operations as those in FIG. 6. However, since the parking assist apparatus 600A is present outside of the own vehicle, description will be given by taking, as an example, the case where a vehicle is parked in a parking place managed by a control system in an automatic valet parking system, for example. When a vehicle A enters the automatic valet parking system, a position of a parking slot assigned from the control system is transmitted to the vehicle A, and the vehicle A is moved to the vicinity of the position of the parking slot.

In step ST100, the vehicle A detects a position of the own vehicle by the vehicle position detection unit 3 and transmits the position as the parking-start position point S0 shown in FIG. 3 to the parking assist apparatus 600A. The information about the position of the vehicle transmitted from the vehicle position detection unit 3 is inputted to the vehicle position input unit 6 of the route generation device 50A.

In step ST101, the vehicle A detects a position of a parking slot by the parking slot position detection unit 2 mounted to the own vehicle, and transmits the position to the parking assist apparatus 600A. The information about the position of the parking slot transmitted from the parking slot position detection unit 2 is inputted to the parking slot position input unit 5 of the route generation device 50A. Alternatively, information about the position of the parking slot assigned from the control system may be used as a position of a parking slot.

In step ST102, the vehicle A detects information about a steering loaded state of the own vehicle by the steering loaded state detection unit 1, and transmits the information to the parking assist apparatus 600A. The information about the steering loaded state transmitted from the steering loaded state detection unit 1 is inputted to the steering loaded state input unit 4 of the route generation device 50A.

The operation in step ST103 is the same as that in FIG. 6.

In step ST111, the guidance route generated in step ST103 is reported to the vehicle A. A vehicle control device of the vehicle A causes the vehicle A to be parked at the position of the assigned parking slot according to the reported guidance route. Although the vehicle A is assumed to automatically travel according to an automatic driving mode without driving by a user, a user may perform a steering operation for travel according to the reported guidance route.

In addition, although an example in which the route generation device 50A in FIG. 1 is used for the above parking assist apparatus 600A has been described, it is needless to say that the route generation device 60A in FIG. 8 or the route generation device 70A in FIG. 13 can be used therefor.

As described above, in the route generation device according to embodiment 1, a guidance route for guiding a vehicle to a parking slot is generated on the basis of a position of the vehicle inputted to the vehicle position input unit 6, a position of the parking slot inputted to the parking slot position input unit 5, and a steering loaded state inputted to the steering loaded state input unit 4, whereby a guidance route for which the steering loaded state has been considered can be generated before start of a parking operation. Consequently, the time for computation can be shortened and the time required for parking can be shortened, as compared to a conventional method in which, for each time of turnabout during steering control, a parking route is generated through determination as to whether or not static steering can be performed.

In addition, the route generation device according to embodiment 1 further includes the number-of-times-of-static-steering upper limit calculation unit 8. Thus, on the basis of the number-of-times-of-static-steering upper limit value calculated by using the information about the steering loaded state, routes in which static steering is performed can be generated until arrival at the number-of-times-of-static-steering upper limit value, and guidance routes in which static steering is not performed can be generated subsequently to the arrival at the number-of-times-of-static-steering upper limit value. Consequently, a guidance route for which the steering loaded state has been considered can be generated before start of a parking operation.

In addition, the route generation device according to embodiment 1 further includes: the output-possible current amount calculation unit 9 which calculates, according to the steering loaded state, an amount of current capable of being outputted during steering control; and the necessary current amount calculation unit 10 which calculates an amount of current necessary in the case of performing, in full, static steering to the position of the parking slot. Thus, the number-of-times-of-static-steering upper limit calculation unit 8 can calculate a number-of-times-of-static-steering upper limit value on the basis of the output-possible current amount, outputted from the output-possible current amount calculation unit 9 and the necessary current amount outputted from the necessary current amount calculation unit 10. Then, the guidance route generation unit 7 generates a guidance route on the basis of the number-of-times-of-static-steering upper limit value. Consequently, before start of a parking operation, route generation can be performed in advance with a prerequisite of a route in which static steering is performed and with which the time for parking is shortened. Furthermore, with respect to the generated route, a guidance route obtained by combining a route in which static steering is performed and a route in which static steering is not performed can be generated according to the steering loaded state.

If the temperature of the EPS motor or the temperature of the EPS-intended ECU is used as the steering loaded state, a number-of-times-of-static-steering upper limit value can be determined through detection of either of the temperature of the motor and the temperature of the ECU. This makes it possible to generate a guidance route for which the temperature of the EPS motor or the temperature of the EPS-intended ECU has been considered and in which static steering can be performed maximally.

Meanwhile, if the number-of-times-of-static-steering upper limit value is determined in consideration of both the temperature of the EPS motor and the temperature of the EPS-intended ECU, a guidance route that results in less load on the steering can be generated.

If the vehicle control device 11 which causes the vehicle to be parked in the parking slot on the basis of the guidance route outputted from the guidance route generation unit 7 of any route generation device among the above route generation devices 50A, 60A, and 70A, is provided, the resultant apparatus can be caused to function as a parking assist apparatus. In particular, with a parking assist apparatus including the route generation device 60A or the route generation, device 70A including the number-of-times-of-static-steering upper limit calculation unit 8, a guidance route for which the steering loaded state has been considered can be generated before start of a parking operation. Therefore, the time required for parking can be shortened.

If a parking assist apparatus including the reporting device 12 which reports, to a vehicle to be parked at a predetermined position of a parking slot, the guidance route outputted from the guidance route generation unit 7 of any route generation device among the above route generation devices 50A, 60A, and 70A, is obtained, the vehicle can be guided to and parked at the position of the assigned parking slot. In addition, the parking assist apparatus can be used as a parking assist apparatus of the control system in the automatic valet parking system in which automatic travel to an assigned parking slot is performed and parking therein is automatically performed without driving by a user. In this case as well, with the parking assist apparatus including the route generation device 60A or the route generation device 70A including the number-of-times-of-static-steering upper limit calculation unit 8, a guidance route for which the steering loaded state has been considered can be generated before start of a parking operation. Therefore, the time required for parking can be shortened.

Embodiment 2

Hereinafter, a route generation device according to embodiment 2 will be described with reference to the drawings.

Figure 23:
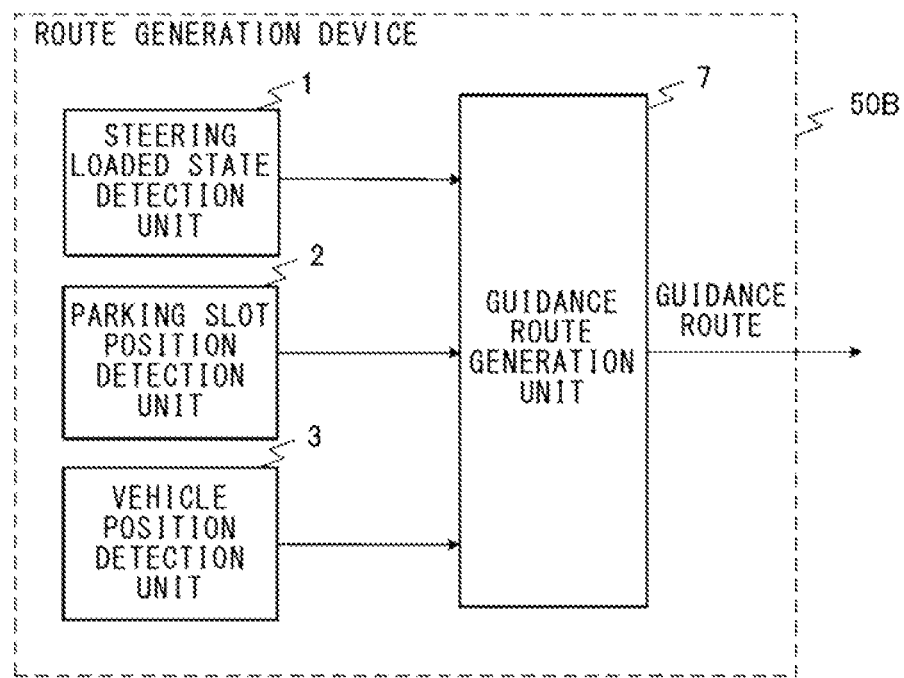
FIG. 23 is a block diagram showing a configuration of a route generation device according to embodiment 2.

FIG. 23 is a block diagram showing a configuration of the route generation device according to embodiment 2. Regarding the route generation device 50A according to embodiment 1 in FIG. 1, detection units which are the steering loaded state detection unit 1, the parking slot position detection unit 2, and the vehicle position detection unit 3 are present outside of the route generation device 50A, and information detected by each of the detection units is inputted to the route generation device 50A. Meanwhile, the configuration of a route generation device 50B in FIG. 23 is different from the configuration of the route generation device 50A according to embodiment 2 in FIG. 1 in that the route generation device 50B itself includes the steering loaded state detection unit 1, the parking slot position detection unit 2, the vehicle position detection unit 3, and the guidance route generation unit 7. Consequently, the route generation device 50B can be configured to enable integration as a route generation device module including the detection units.

In the route generation device 50B according to embodiment 2, on the basis of each of pieces of information which are a steering loaded state detected by the steering loaded state detection unit 1, a position of a parking slot near the vehicle detected by the parking slot position detection unit 2, and a position of the vehicle detected by the vehicle position detection unit 3, the guidance route generation unit 7 generates a guidance route for guidance to the position of the parking slot.

The method for detecting a steering loaded state of the vehicle by the steering loaded state detection unit 1, the method for detecting a position of a nearby parking slot by the parking slot position detection unit 2, the method for detecting a position of the vehicle by the vehicle position detection unit 3, and the method for generating a guidance route by the guidance route generation unit 7, are the same as those in embodiment 1.

An operation of the route generation device 50B will be described with reference to a flowchart shown in FIG. 24.

First, in step ST300, the vehicle position detection unit 3 detects a present position of the own vehicle.

Then, in step ST301, the parking slot position detection unit 2 detects a position of a nearby parking slot.

Then, in step ST302, the steering loaded state detection unit 1 detects a steering loaded state.

Then, in step ST103, the guidance route generation unit 7 generates a guidance route to the position of the parking slot detected by the parking slot position detection unit 2, with the position of the vehicle detected by the vehicle position detection unit 3 being an origin of the guidance route.

The detailed operation in step ST103 is the same as that described with reference to the flowchart in FIG. 7.

In addition, the route generation device according to the present embodiment 2 further includes the number-of-times-of-static-steering upper limit calculation unit which calculates a number-of-times-of-static-steering upper limit value on the basis of the steering loaded state of the vehicle detected by the steering loaded state detection unit 1, and a guidance route can be generated on the basis of the number-of-times-of-static-steering upper limit value.

Figure 25:
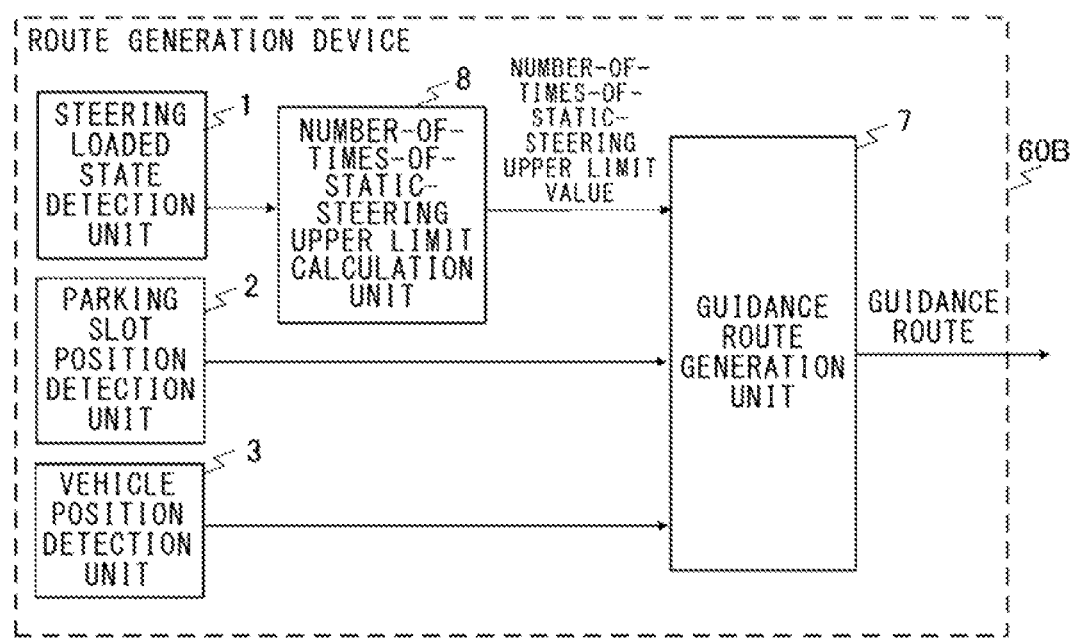
FIG. 25 is a block diagram shewing another configuration of the route generation device according to embodiment 2.

FIG. 25 is a block diagram showing another configuration of the route generation device according to the present embodiment 2. In this configuration, the number-of-times-of-static-steering upper limit calculation unit 3 is further provided to the route generation device in FIG. 23.

In FIG. 25, a route generation device 60B includes the number-of-times-of-static-steering upper limit calculation unit 8 which calculates, on the basis of the steering loaded state detected by the steering loaded state detection unit 1, a number-of-times-of-static-steering upper limit value which is the number of times up to which static steering can be performed on the guidance route to the end of parking. Then, the guidance route generation unit 7 generates a guidance route on the basis of the number-of-times-of-static-steering upper limit value, the position of the parking slot detected by the parking slot position detection unit 2, and the position of the vehicle as a parking-start position detected by the vehicle position detection unit 3.

Figure 7:
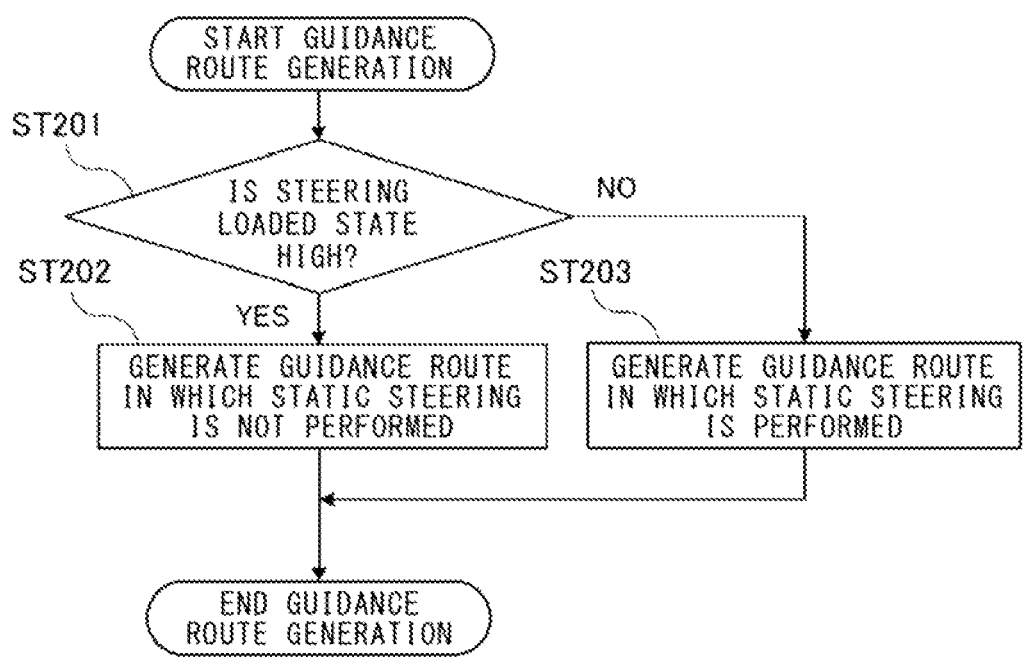
FIG. 7 is a flowchart showing an operation of a guidance route generation unit of the route generation device according to embodiment 1.

The configuration of the route generation device 60B in FIG. 25 is different from the configuration of the route generation device 60A according to embodiment 1 in FIG. 7 in that the route generation device 60B includes the steering loaded state detection unit 1, the parking slot position detection unit 2, and the vehicle position detection unit 3.

In the route generation device 60B in FIG. 25, the method for calculating a number-of-times-of-static-steering upper limit value by the number-of-times-of-static-steering upper limit calculation unit 8, and the method for generating a guidance route by the guidance route generation unit 7, are the same as those in embodiment 1.

Figure 26:
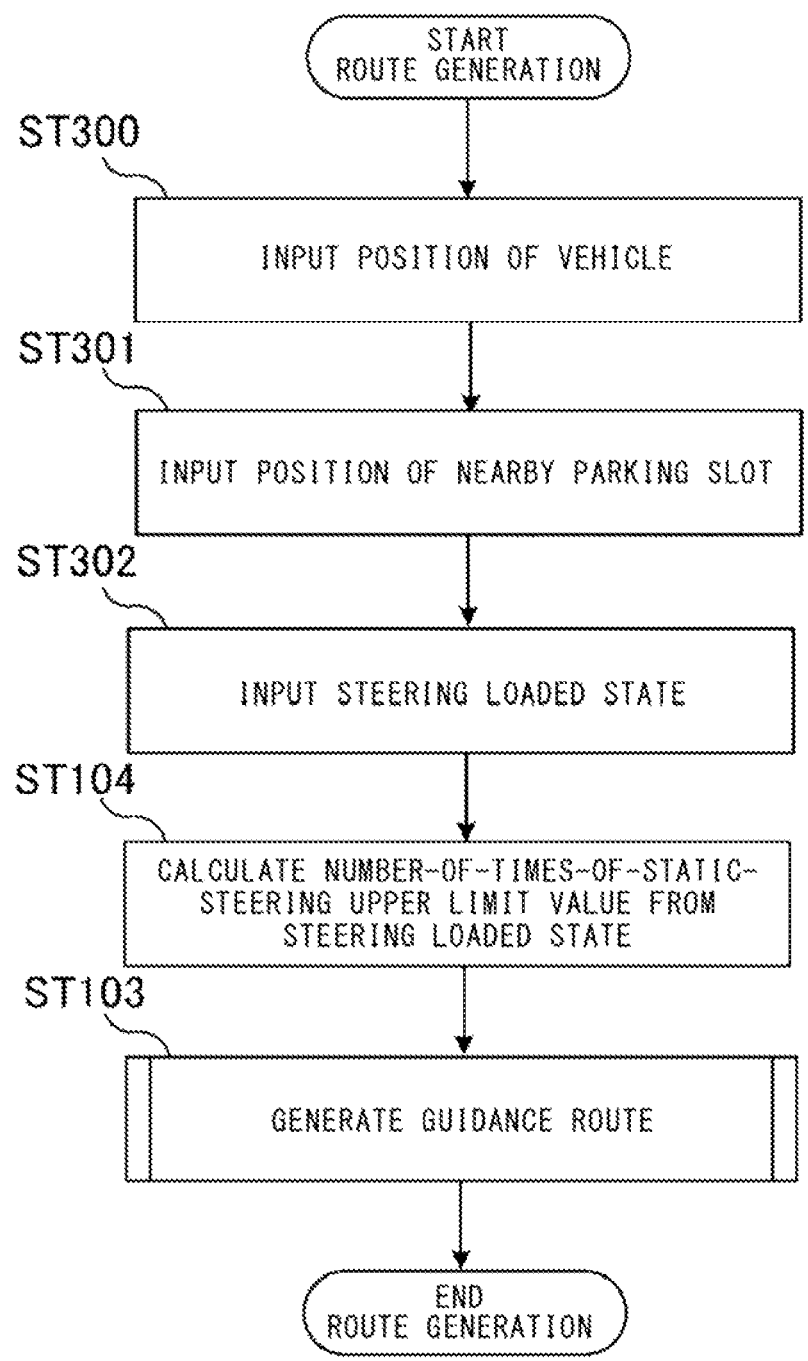
FIG. 26 is a flowchart showing an operation of the route generation device in FIG. 25.

FIG. 26 is a flowchart showing an operation of the route generation device 60B. In the flowchart in FIG. 26, step ST104 is added between step ST302 and step ST103 in the flowchart in FIG. 24, and furthermore, the operation in step ST103 is different. The operation in step ST104 and the detailed operation in step ST103 are the same as those described with reference to the flowcharts in FIG. 11 and FIG. 12 in embodiment 1.

In embodiment 2 as well, a number-of-times-of-static-steering upper limit value is calculated in advance on the basis of the steering loaded state, and thus computation as to whether static steering can be performed does not need to be performed for each time of turnabout during steering control.

Figure 27:
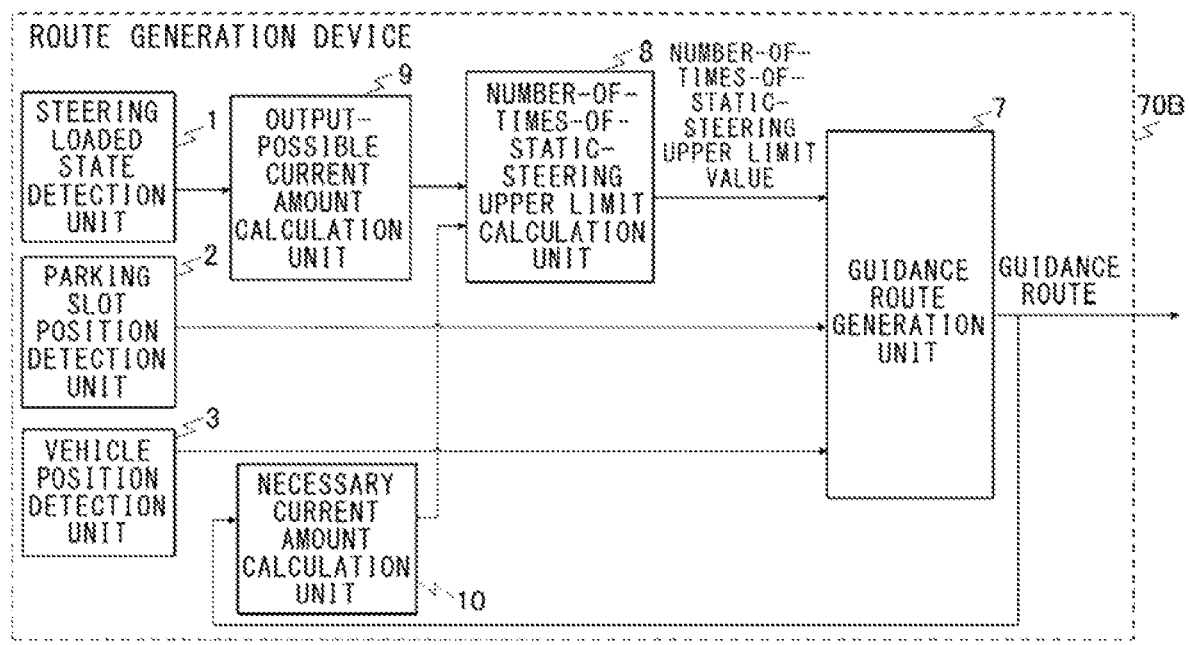
FIG. 27 is a block diagram showing still another configuration of the route generation device according to embodiment 2.

FIG. 27 is a block diagram showing still another configuration of the route generation device according to the present embodiment 2. As compared to the route generation device 60B in FIG. 25, a route generation device 70B in FIG. 27 further includes: the output-possible current amount calculation unit 9 which calculates, on the basis of the steering loaded state detected by the steering loaded state detection unit 2, an output-possible current amount which is the amount of current capable of being outputted during steering control; and the necessary current amount calculation unit 10 which calculates, on the basis of the guidance route outputted from the guidance route generation unit 7, an amount of current necessary for travel on the guidance route during steering control. Then, the number-of-times-of-static-steering upper limit calculation unit 3 calculates a number-of-times-of-static-steering upper limit value on the basis of the output-possible current amount outputted from the output-possible current amount calculation unit 9 and the necessary current amount outputted from the necessary current amount calculation unit 10, and outputs the number-of-times-of-static-steering upper limit value. The guidance route generation unit 7 generates a guidance route on the basis of the number-of-times-of-static-steering upper limit value outputted from the number-of-times-of-static-steering upper limit calculation unit 8.

The configuration of the route generation device 70B in FIG. 27 is different from the configuration of the route generation device 70A according to embodiment 1 in FIG. 13 in that the route generation device 70B includes the steering loaded state detection unit 1, the parking slot position detection unit 2, and the vehicle position detection unit 3.

In the route generation device 70B, the method for calculating a number-of-times-of-static-steering upper limit value by the number-of-times-of-static-steering upper limit calculation unit 8, the method for calculating an output current amount by the output-possible current amount calculation unit 9, and the method for calculating a necessary current amount by the necessary current amount calculation unit 10, are the same as those in embodiment 1.

Figure 28:
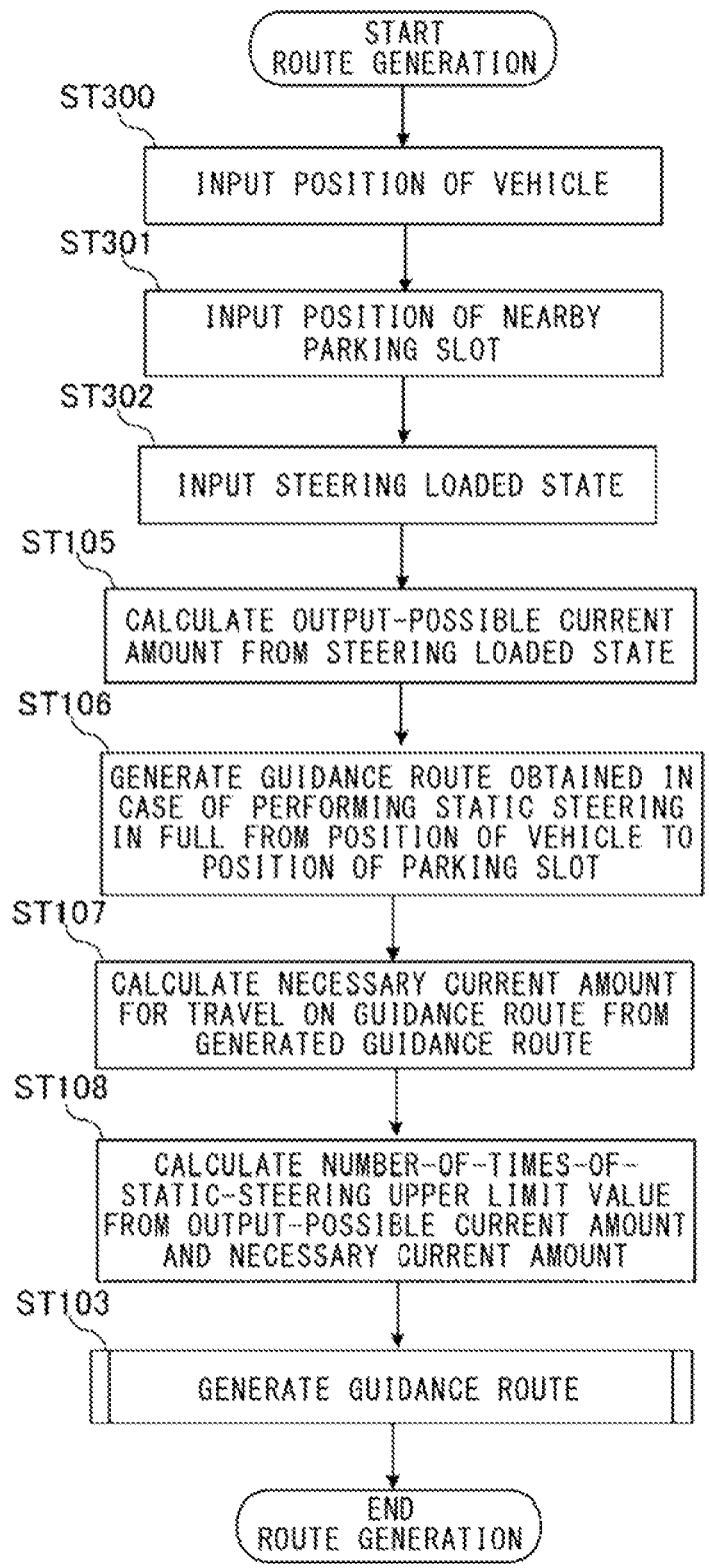
FIG. 28 is a flowchart showing an operation of the route generation device in FIG. 27.

FIG. 28 is a flowchart showing an operation of the route generation device 70B. In the flowchart in FIG. 28, step ST105 to step ST103 are added between step ST302 and step ST103 in the flowchart in FIG. 24, and furthermore, the operation in step ST103 is different. The operations in steps from step ST300 to step ST302 are the same as those in the flowchart in FIG. 24. The operations in steps from step ST105 to step ST103 and the detailed operation in step ST103 are the same as those described with reference to the flowcharts in FIG. 17 and FIG. 18 in embodiment 1.

Next, a parking assist apparatus in which the above route generation device is used, will be described.

If the route generation device according to embodiment 2 is provided with a vehicle control device which causes the vehicle to be parked in the parking slot on the basis of the guidance route outputted from the guidance route generation unit 7 of the route generation device in the same manner as in embodiment 1, the resultant apparatus can be caused to function as a parking assist apparatus.

Figure 29:
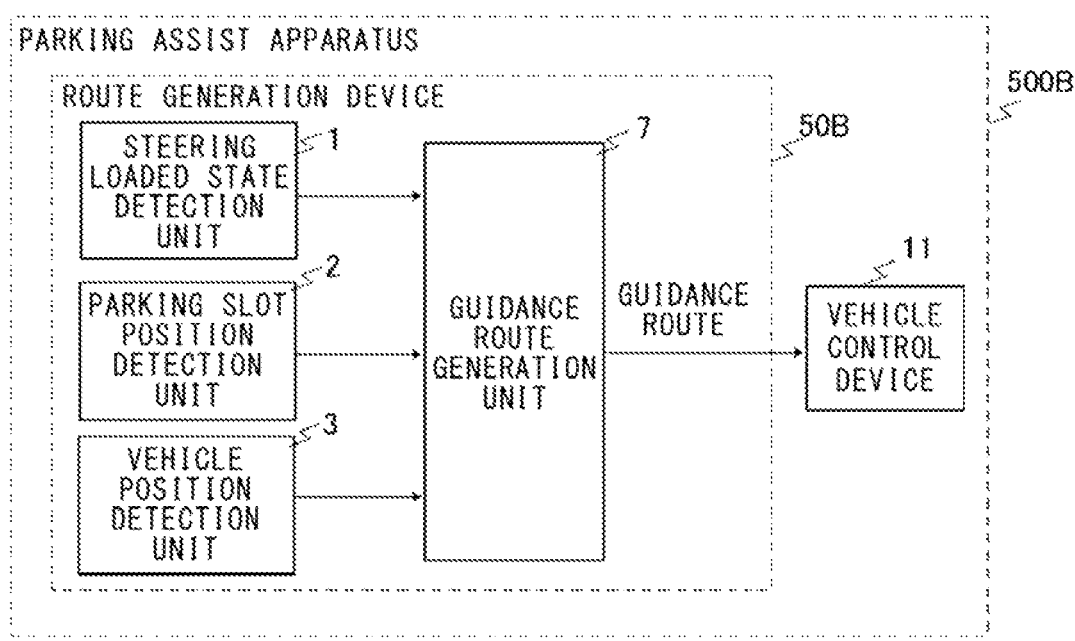
FIG. 29 is a block diagram showing a configuration of a parking assist apparatus according to embodiment 2.

FIG. 29 is a block diagram showing a configuration of a parking assist apparatus according to embodiment 2. A configuration of a parking assist apparatus 500B obtained by further providing the vehicle control device 11 to the route generation device 50B in FIG. 23, is shown. The operation of the vehicle control device 11 is the same as that in embodiment 1.

Figure 30:
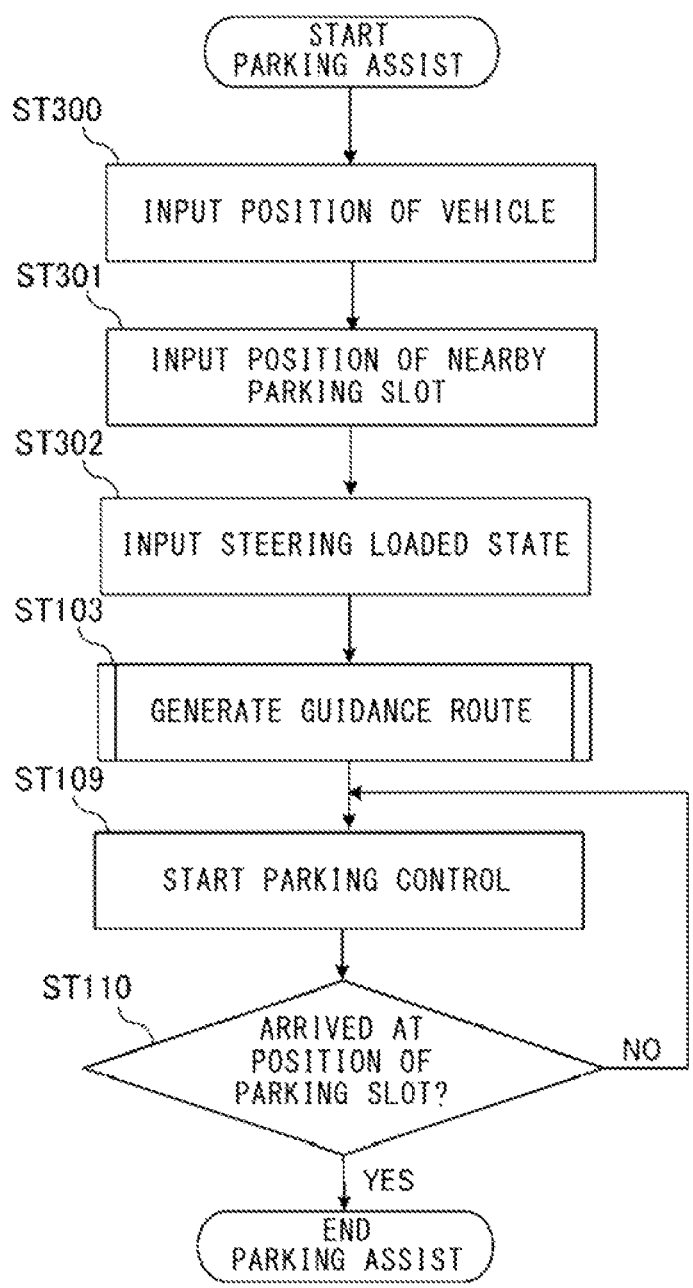
FIG. 30 is a flowchart showing an operation of the parking assist apparatus in FIG. 29.

FIG. 30 is a flowchart showing an operation of the parking assist apparatus 500B in FIG. 29. In the flowchart in FIG. 30, step ST109 and step ST110 are added subsequently to step ST103 in the flowchart in FIG. 24. The operations in steps from step ST300 to step ST103 are the same as those described with reference to the flowchart in FIG. 24. The operations in step ST109 and step ST110 are the same as these described with reference to the flowchart in FIG. 20.

Although an example in which the route generation device 50B in FIG. 23 is used for the above parking assist, apparatus 500B has been described, it is needless to say that the route generation device 60B in FIG. 25 or the route generation device 70B in FIG. 27 can be used therefor.

Alternatively, the route generation device according to embodiment 2 may be provided with a reporting device which reports, to outside of the vehicle, the guidance route outputted from the guidance route generation unit 7 of the route generation device. For example, in the case where a vehicle is parked in a parking place managed by a control system in an automatic valet parking system, the guidance route is reported to the control system in the automatic valet parking system. Consequently, a vehicle management system of the automatic valet parking system can ascertain the guidance route (i.e. travel route) of the vehicle that automatically travels to an assigned parking slot and that is automatically parked therein. Therefore, use as a parking assist apparatus is enabled.

Figure 31:
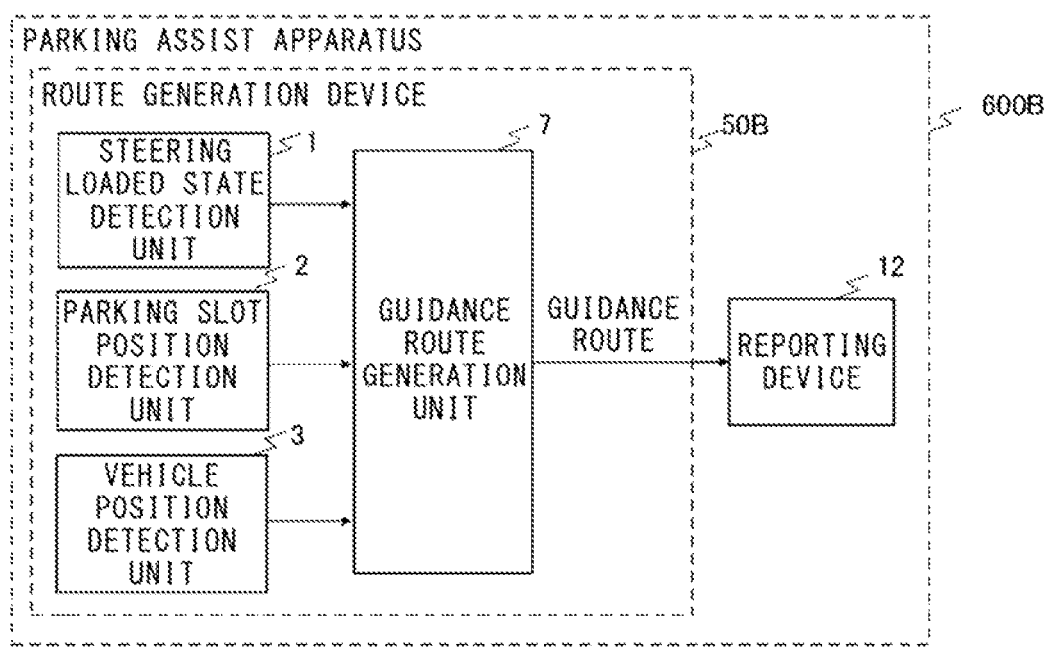
FIG. 31 is a block diagram showing another configuration of the parking assist apparatus according to embodiment 2.

FIG. 31 is a block diagram showing another configuration of the parking assist apparatus according to embodiment 2, and shows a configuration of a parking assist apparatus 600B obtained by further providing the reporting device 12 to the route generation device 50B in FIG. 23. Regarding the operation, of the reporting device 12, the guidance route outputted from the guidance route generation unit 7 is reported in the same manner as in embodiment 1, but the destination of the reporting is the vehicle management system of the control system in the automatic valet parking system.

Figure 32:
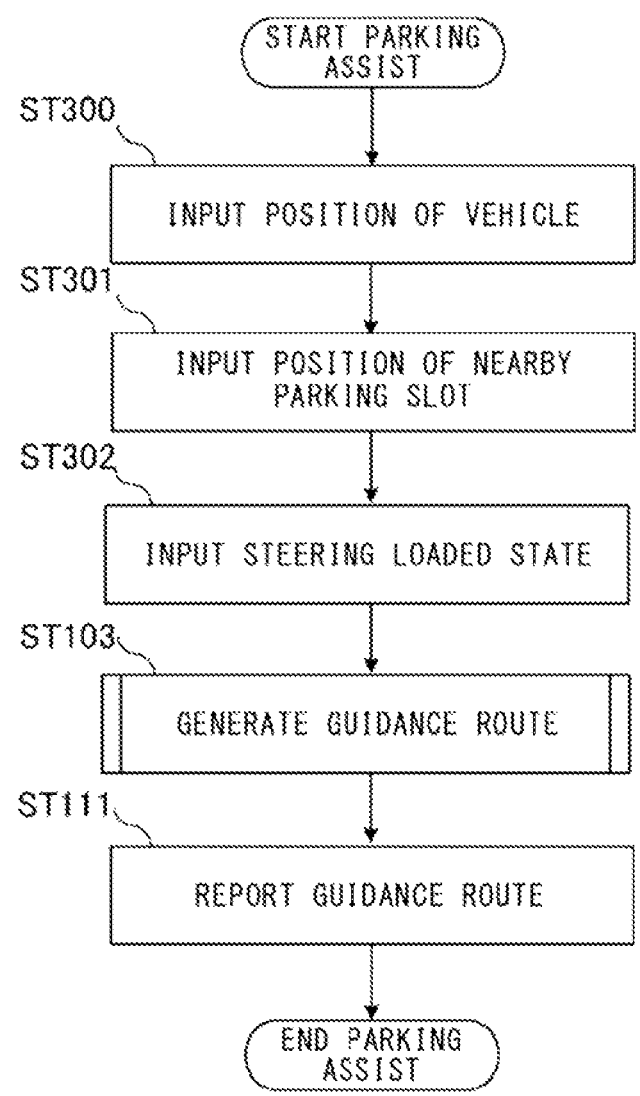
FIG. 32 is a flowchart showing an operation of the parking assist, apparatus in FIG. 31.

An operation of the parking assist apparatus 600B in FIG. 31 will be described with reference to a flowchart shown in FIG. 32. In the flowchart in FIG. 32, step ST111 is added subsequently to the step ST103, as compared to the flowchart in FIG. 24.

Figure 24:
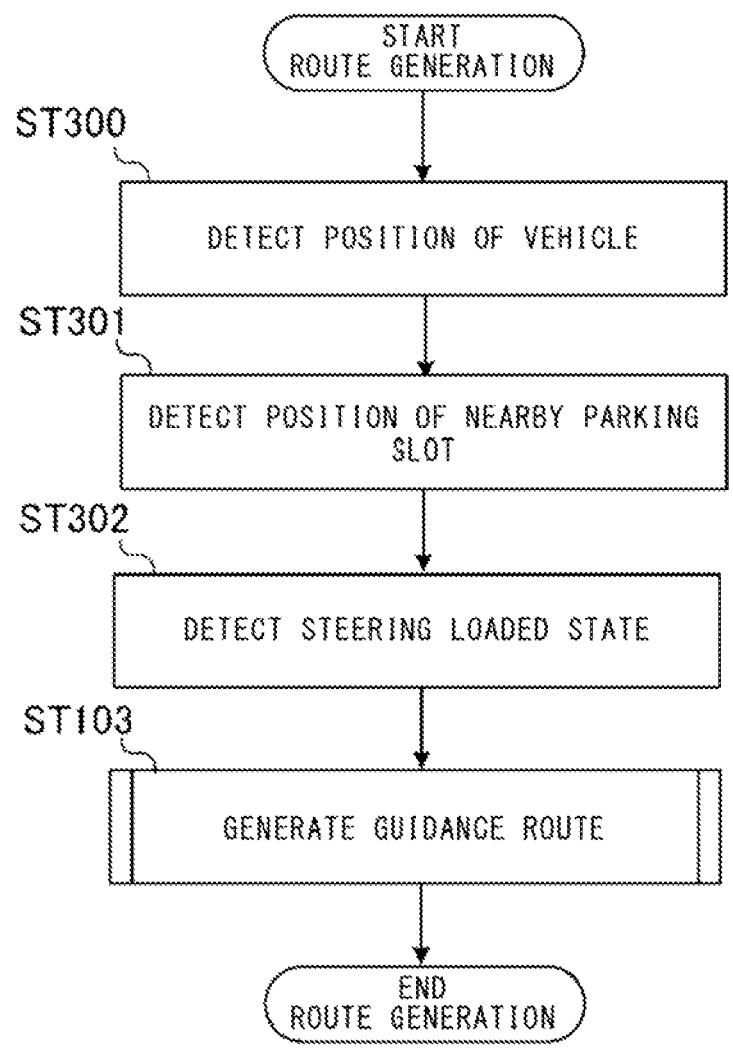
FIG. 24 is a flowchart showing an operation of the route generation device in FIG. 23.

The operations in steps from step ST300 to step ST103 are the same operations as those in FIG. 24. However, since the parking assist apparatus 600B is present in the own vehicle, description will be given by taking, as an example, the case where an own vehicle transmits a guidance route to a control system in an automatic valet parking system, and a vehicle management system of the control system performs vehicle management. When a vehicle B is moved to the vicinity of a position of a parking slot assigned from the control system, the vehicle B detects a position of the own vehicle by the vehicle position detection unit 3 and inputs the position as the parking-start position point S0 shown in FIG. 3 to the guidance route generation unit 7 of the route generation device 50B, in step ST300.

In step ST301, the vehicle B detects a position of a parking slot by the parking slot position detection unit 2 mounted to the own vehicle and inputs the position to the guidance route generation unit 7 of the route generation device 50B. Alternatively, information about the position of the parking slot assigned from the control system may be used as a position of a parking slot.

In step ST302, the vehicle 8 detects information about a steering loaded state of the own vehicle by the steering loaded state detection unit 1 and inputs the information to the guidance route generation unit 7 of the route generation device 50B.

The operation in step ST103 is the same as that in FIG. 24.

In step ST111, the guidance route generated in step ST103 is reported to the vehicle management system of the control system in the automatic valet parking system. The vehicle management system ascertains, on the basis of the reported guidance route, on what guidance route the vehicle B is to travel. The vehicle management system performs vehicle management inside a parking place managed by the automatic valet parking system such that, for example, no other vehicle passes on the guidance route of the vehicle B.

Although an example in which the route generation device 50B in FIG. 23 is used for the above parking assist apparatus 600B has been described, it is needless to say that the route generation device 60B in FIG. 25 or the route generation device 70B in FIG. 27 can be used.

As described above, embodiment 2 exhibits the same advantageous effects as those of embodiment 1. That is, on the basis of a steering loaded state detected by the steering loaded state detection unit 1, a position of a parking slot near a vehicle detected by the parking slot position detection unit 2, and a position of the vehicle detected by the vehicle position detection unit 3, a guidance route for guiding the vehicle to the parking slot is generated, whereby a guidance route for which the steering loaded state has been considered can be generated before start of a parking operation. Consequently, the time for computation can be shortened and the time required for parking can be shortened, as compared to the conventional method in which determination as to whether or not static steering can be performed is performed for each time of turnabout during steering control.

In addition, the route generation device according to embodiment 2 further includes the number-of-times-of-static-steering upper limit calculation unit 8. Thus, on the basis of the number-of-times-of-static-steering upper limit value calculated by using the information about the steering loaded state, routes in which static steering is performed can be generated until arrival at the number-of-times-of-static-steering upper limit value, and guidance routes in which static steering is not performed can be generated subsequently to the arrival at the number-of-times-of-static-steering upper limit value. Consequently, a guidance route for which the steering loaded state has been considered can be generated before start of a parking operation.

In addition, the route generation device according to embodiment 2 further includes: the output-possible current amount calculation unit 9 which calculates, according to the steering loaded state, an amount of current capable of being outputted during steering control; and the necessary current amount calculation unit 10 which calculates an amount of current necessary in the case of performing, in full, static steering to the position of the parking slot. Thus, the number-of-times-of-static-steering upper limit calculation unit 3 can calculate a number-of-times-of-static-steering upper limit value on the basis of the output-possible current amount outputted from the output-possible current amount calculation unit 9 and the necessary current amount outputted from the necessary current amount calculation unit 10. Then, the guidance route generation unit 7 generates a guidance route on the basis of the number-of-times-of-static-steering upper limit value. Consequently, before start of a parking operation, route generation can be performed in advance with a prerequisite of a route in which static steering is performed and with which the time for parking is shortened. Furthermore, with respect to the generated route, a guidance route obtained by combining a route in which static steering is performed and a route in which static steering is not performed can be generated according to the steering loaded state.

In addition, in embodiment 2 as well, if the temperature of the EPS motor or the temperature of the EPS-intended ECU is used as the steering loaded state, a number-of-times-of-static-steering upper limit value can be determined through detection of either of the temperature of the motor and the temperature of the ECU. This makes it possible to generate a guidance route for which the temperature of the EPS motor or the temperature of the EPS-intended ECU has been considered and in which static steering can be performed maximally.

Meanwhile, if the number-of-times-of-static-steering upper limit value is determined in consideration of both the temperature of the EPS motor and the temperature of the EPS-intended ECU, a guidance route that results in less load on the steering can be generated.

If the vehicle control device 11 which causes the vehicle to be parked in the parking slot on the basis of the guidance route outputted from the guidance route generation unit 7 of any route generation device among the above route generation devices 50B, 60B, and 70B, is provided, the resultant apparatus can be caused to function as a parking assist apparatus. In particular, with a parking assist apparatus including the route generation device 60B or the route generation device 70B including the number-of-times-of-static-steering upper limit calculation unit 8, a guidance route for which the steering loaded state has been considered can be generated before start of a parking operation. Therefore, the time required for parking can be shortened.

If a parking assist apparatus including the reporting device 12 which reports, to the automatic valet parking system, the guidance route outputted from the guidance route generation unit 7 of any route generation device among the above route generation devices 50B, 60B, and 70B, is obtained, the vehicle management system of the control system in the automatic valet parking system can ascertain the guidance route (i.e., travel route) of the vehicle that automatically travels to an assigned parking slot and that is automatically parked therein. Therefore, functioning as a parking assist apparatus can be achieved. In this case as well, with a parking assist apparatus including the route generation device 60B or the route generation device 70B including the number-of-times-of-static-steering upper limit calculation unit 3, a guidance route for which the steering loaded state has been considered can be generated before start of a parking operation. Therefore, the time required for parking can be shortened.

Figure 22:
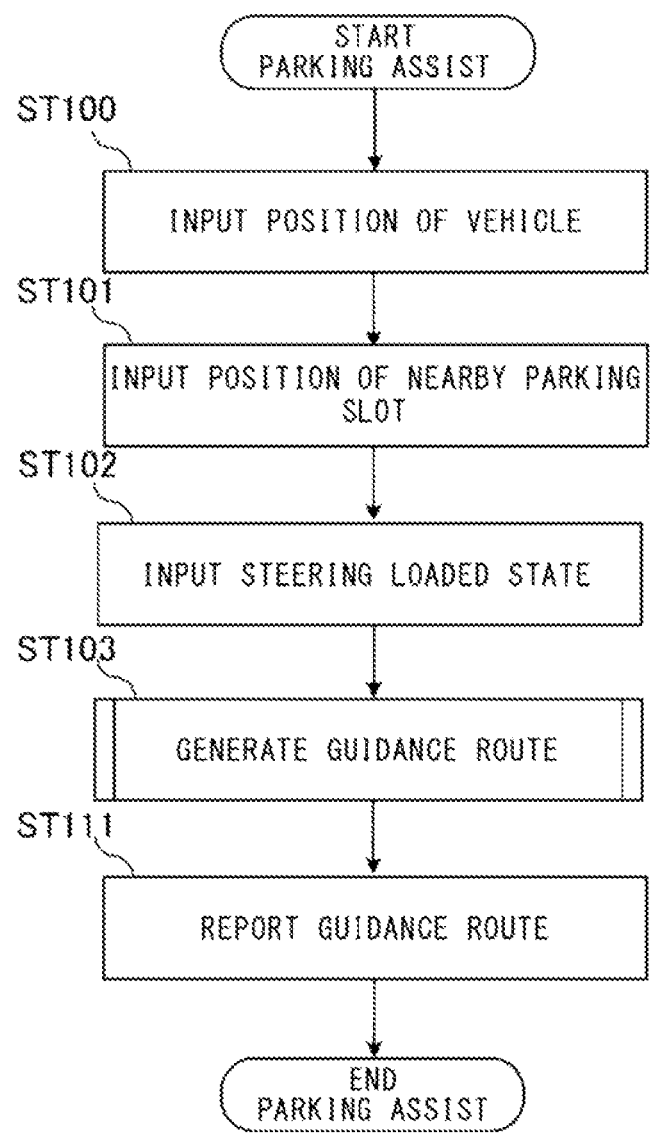
FIG. 22 is a flowchart showing an operation of the parking assist, apparatus in FIG. 21.

In FIGS. 21 and 22 in embodiment 1, the parking assist apparatus 600A is disposed outside of a vehicle, and the reporting device 12 is configured to report, to a vehicle to be parked in a predetermined parking slot, the guidance route outputted from the guidance route generation unit 7. However, it is needless to say that, as in FIGS. 31 and 32 in the above embodiment 2, the parking assist apparatus 600A may be mounted to the own vehicle, and the guidance route outputted from the guidance route generation unit 7 may be reported to the automatic valet parking system.

Figure 33:
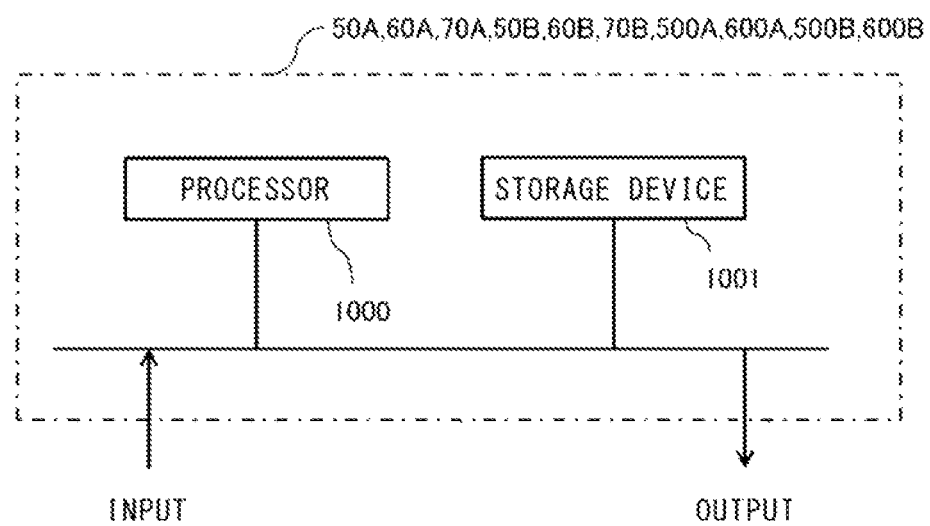
FIG. 33 illustrates a hardware configuration of each route generation device and each parking assist apparatus.

Each of the route generation devices 50A, 60A, 70A, 50B, 60B, and 70B and the parking assist apparatuses 500A, 600A, 500B, and 600B is composed of a processor 1000 and a storage device 1001, an example of hardware thereof being shown in FIG. 33. Although not shown, the storage device includes a volatile storage device such as a random access memory, and a nonvolatile auxiliary storage device such as a flash memory. Alternatively, the storage device may include, as the auxiliary storage device, a hard disk instead of a flash memory. The processor 1000 executes a program inputted from the storage device 1001. In this case, the program is inputted from the auxiliary storage device via the volatile storage device to the processor 1000. Further, the processor 1000 may output data such as a computation result to the volatile storage device of the storage device 1001, or may save the data to the auxiliary storage device via the volatile storage device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the technical scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 steering loaded state detection unit
2 parking slot position detection unit
3 vehicle position detection unit
4 steering loaded state input unit
5 parking slot position input unit
6 vehicle position input unit
7 guidance route generation unit
8 number-of-times-of-static-steering upper limit calculation unit
9 output-possible current amount calculation unit
10 necessary current amount calculation unit
11 vehicle control device
12 reporting device
40 parking slot
50A, 60A, 70A, 50B, 60B, 70B route generation device
100 own vehicle
101 parked vehicle
102 ultrasonic sensor
500A, 600A, 500B, 600B parking assist apparatus
1000 processor
1001 storage device
CN0, CN1 corner point of parked vehicle

The invention claimed is:

1. A route generation device comprising at least one processor configured to:
    obtain a steering loaded state of a vehicle;
    obtain a position of a parking slot near the vehicle;
    obtain a position of the vehicle;
    calculate, based on the steering loaded state, a maximum number of static steering turnabouts up to which static steering of the vehicle can be performed between the position of the vehicle and the position of the parking slot; and
    generate a parking guidance route in which static steering is performed until a number of static steering turnabouts performed starting from the position of the vehicle reaches the maximum number of static steering turnabouts, based on the position of the vehicle, the position of the parking slot, and the maximum number of static steering turnabouts.

2. A route generation device comprising at least one processor configured to:
    detect a steering loaded state of a vehicle;
    detect a position of a parking slot near the vehicle;
    detect a position of the vehicle;
    calculate, based on the steering loaded state, a maximum number of static steering turnabouts up to which static steering of the vehicle can be performed between the position of the vehicle and the position of the parking slot; and
    generate a parking guidance route in which static steering is performed until a number of static steering turnabouts performed starting from the position of the vehicle reaches the maximum number of static steering turnabouts, based on the position of the vehicle, the position of the parking slot, and the maximum number of static steering turnabout.

3. The route generation device according to claim 1, wherein the at least one processor is further configured to:
    calculate, based on the steering loaded state, an amount of current capable of being outputted during steering control of the vehicle; and
    calculate an amount of current necessary during steering control of the vehicle from the position of the vehicle to the position of the parking slot,
    calculates the maximum number of static steering turnabouts based on the amount of current capable of being outputted and the amount of current necessary during steering control, and
    generate the parking guidance route based on the maximum number of static steering turnabouts.

4. The route generation device according to claim 1, wherein the at least one processor is further configured to:
    generate the parking guidance route such that: static steering is performed until arrival at the maximum number of static steering turnabouts; and static steering is not performed upon exceeding the maximum number of static steering turnabouts.

5. The route generation device according to claim 1, wherein
the steering loaded state of the vehicle is a temperature of a motor of an electric power steering.

6. The route generation device according to claim 1, wherein
the steering loaded state of the vehicle is a temperature of an ECU for an electric power steering.

7. A parking assist apparatus comprising:
the route generation device according to claim 1; and
a vehicle control device configured to cause the vehicle to be parked in the parking slot based on the parking guidance route.

8. A parking assist apparatus comprising:
the route generation device according to claim 1; and
a reporting device configured to report the parking guidance route.

9. A route generation method comprising:
inputting a steering loaded state of a vehicle;
inputting a position of a parking slot near the vehicle;
inputting a position of the vehicle;
calculating, based on the steering loaded state inputted, a maximum number of static steering turnabouts up to which static steering of the vehicle can be performed; and
generating a parking guidance route in which static steering is performed until a number of static steering turnabouts performed starting from the position of the vehicle reaches the maximum number of static steering turnabouts, based on the position of the parking slot, the position of the vehicle, and the maximum number of static steering turnabouts.

10. The route generation method according to claim 9, further comprising:
calculating, based on the steering loaded state, an amount of current capable of being outputted during steering control, before calculating the maximum number of static steering turnabouts; and
calculating an amount of current necessary during steering control of the vehicle from the position of the vehicle to the position of the parking slot, before calculating the maximum number of static steering turnabouts, wherein
calculating the maximum number of static steering turnabouts based on the amount of current capable of being outputted and the amount of current necessary during steering control.

11. A parking assist method comprising
parking the vehicle in the parking slot based on the parking guidance route generated by the route generation method according to claim 9.

12. A parking assist method comprising
reporting the parking guidance route generated by the route generation method according to claim 9 to the vehicle, to park the vehicle in the parking slot.

13. A parking assist method comprising:
reporting the guidance route generated by the route generation method according to claim 9 to a vehicle management system configured to manage the vehicle that travels in a parking place including the parking slot; and
parking the vehicle in the parking slot.

14. The route generation device according to claim 2, wherein the at least one processor is further configured to:
calculate, based on the steering loaded state, an amount of current capable of being outputted during steering control of the vehicle; and
calculate an amount of current necessary during steering control of the vehicle from the position of the vehicle to the position of the parking slot, wherein
calculate the maximum number of static steering turnabouts based on the amount of current capable of being outputted and the amount of current necessary during steering control, and
generate the parking guidance route based on the maximum number of static steering turnabouts.

15. The route generation device according to claim 2, wherein the at least one processor is further configured to:
generate the parking guidance route such that: static steering is performed until arrival at the maximum number of static steering turnabouts; and static steering is not performed upon exceeding the maximum number of static steering turnabouts.

16. A parking assist apparatus comprising:
the route generation device according to claim 2; and
a vehicle control device configured to cause the vehicle to be parked in the parking slot based on the parking guidance route.

17. A parking assist apparatus comprising:
the route generation device according to claim 1; and
a reporting device configured to report the parking guidance route.

18. A parking assist method comprising
parking the vehicle in the parking slot based on the parking guidance route generated by the route generation method according to claim 10.

19. A parking assist method comprising
reporting the parking guidance route generated by the route generation method according to claim 10 to the vehicle, to park the vehicle in the parking slot.

20. A parking assist method comprising:
reporting the parking guidance route generated by the route generation method according to claim 10 to a vehicle management system configured to manage the vehicle that travels in a parking place including the parking slot; and
parking the vehicle in the parking slot.

* * * * *